（12） United States Patent
Tingstrom et al.

(10) Patent No.: US 8,898,285 B2
(45) Date of Patent: Nov. 25, 2014

(54) SERVICE ORIENTED ARCHITECTURE VERSION AND DEPENDENCY CONTROL

(75) Inventors: Daniel James Tingstrom, Ithaca, NY (US); Robert A. Joyce, Ithaca, NY (US); Matthew A. Stillerman, Ithaca, NY (US); Stephen Kurt Brueckner, Ithaca, NY (US); Haim Yehuda Bar, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 862 days.

(21) Appl. No.: 12/917,356

(22) Filed: Nov. 1, 2010

(65) Prior Publication Data
US 2012/0110093 A1    May 3, 2012

(51) Int. Cl.
G06F 15/173    (2006.01)
G06F 17/30    (2006.01)

(52) U.S. Cl.
CPC .... *G06F 17/30899* (2013.01); *G06F 17/30309* (2013.01)
USPC ...................................................... 709/224

(58) Field of Classification Search
None
See application file for complete search history.

(56) References Cited

U.S. PATENT DOCUMENTS

2005/0055247 A1*  3/2005  Suermondt et al. ............... 705/2
2008/0028068 A1*  1/2008  Nochta et al. ................. 709/224
2009/0144305 A1*  6/2009  Little ............................ 707/101

OTHER PUBLICATIONS

Information Society Technologies, "WP3: Autopoietic P2P Networks," OPAALS Project, Sep. 2009, 225 pp.
O'Sullivan, "Making Sense of Revision-Control Systems," Communications of the ACM, vol. 52, No. 9, pp. 56-62, Sep. 2009.
Haas, "WSDL 2.0: What's New?" Aug. 2004, http://www.w3.org/2004/07/xml2004-hh/wsdl20-update.html, 9 pp., published by World Wide Web Consortium.
Farrell, "Semantic Annotations for WSDL and XML Schema," W3C Recommendation, Aug. 28, 2007, http://www.w3.org/TR/2007/REC-sawsdl-20070828, 31 pp., published by World Wide Web Consortium.
Office Action from U.S. Appl. No. 13/316,258, dated Feb. 14, 2014, 13 pp.
Response to Office Action dated Feb. 14, 2014, from U.S. Appl. No. 13/316,258, dated Jun. 16, 2014, 18 pp.

* cited by examiner

*Primary Examiner* — Scott Christensen
(74) *Attorney, Agent, or Firm* — Shumaker & Sieffert, P.A.

(57) ABSTRACT

This disclosure is directed to techniques for providing version control functionality for web services of one or more service oriented architecture (SOA) systems. According to these techniques, a version control service (VCS) may receive an indication of a version update for a first web service. In response to the received request, the VCS determines whether the version update, if executed within the SOA system, will cause a change in operation of a second web service. If the version update will cause a change, VCS provides an indication of the determined change to a user.

30 Claims, 15 Drawing Sheets

FIG. 14

SERVICE ORIENTED ARCHITECTURE VERSION AND DEPENDENCY CONTROL

STATEMENT REGARDING FEDERALLY SPONSORED RESEARCH OR DEVELOPMENT

This invention was made with Government support under Contract FA8750-09-C-0164, awarded by Air Force. The Government has certain rights in this invention.

TECHNICAL FIELD

The disclosure relates generally to software management. More specifically, this disclosure is directed to management of web services executable within a Service Oriented Architecture (SOA) system.

BACKGROUND

The relatively recent advent of large scale computing networks, such as the Internet, have lead to a variety of new mechanisms for providing network-based services. One mechanism is a web service. A web service refers to software executing on one or more servers that is used specifically to provide a network-accessible interface to data, functions or other form of network resource. That is the web service exposes to network resource such that the network resource may be utilized by other software applications. The web service is referred to as a "web" service since it typically provides an application programming interface (API) that may be invoked by the messaging protocols executing over the hypertext transfer protocol (HTTP) protocol, which is typically associated with the "World Wide Web.". However, instead of being accessed by a user via a web browser, other software applications invoke the web service so as to make use of the functionality provided by the web services. For example, software applications may issue extensible markup language (XML)-based messages using the Simple Object Access Protocol (SOAP) using hypertext transfer protocol (HTTP) or hypertext transfer protocol secure (HTTPS) to invoke a web service.

As one example, an enterprise may utilize web services to provide access to internal systems and to allow the systems to exchange information. For example, an enterprise may deploy a web service to provide access function to an inventory management system. Similarly, the enterprise may deploy web services to expose access to an accounting system that maintains accounts receivable information and a sales force management system that maintains customer account information. The various enterprise software systems may utilize the web services so as to directly access and exchange data with each other. In many cases, an intermediate web service may invoke one or more other web services, which may in turn utilize other web services. In this way, complex networking environments may utilize numerous web services configured to communicate with one another to exchange information, either on the same domain, or different domains.

Recently, software frameworks have been developed so as to standardize mechanisms by which web services communicate with each other and exchange data. One type of framework, referred to as a system oriented architecture (SOA) system provides an architecture for creating and using business processes packaged as interoperable web services. Utilizing the SOA framework, the independent web services exchange information via a defined enterprise services bus (ESB), which provides an abstraction layer on top of an enterprise messaging system. Moreover, the SOA system defines a context in which web services of the SOA system may be invoked. For example, services of the SOA system typically include an associated XML format file or files that web service developers may use to specify how a particular web service is invoked, e.g., available inputs and outputs, their format, and/or how to use them. An XML file that defines an interface for a web service may be referred to as a web services descriptive language (WSDL) file, where WSDL is an XML-based language that defines a model for describing the web service. Rather than defining an application programming interface for web application itself (as with a distributed or modular computing architecture as described above), an SOA system may, via a WSDL file, define the interface in terms of protocols and functionality. Additional details regarding SOA and WSDL may be found in Josuttis, N. SOA in Practice: The Art of Distributed System Design. O'Reilly. 2007, J. Farrell, H. Lausen, "Semantic Annotations for WSDL and XML Schema" W3C Recommendation, August 2007; http://www.w3.org/TR/sawsdl/, and Haas, Hugo. WSDL 2.0: What's new? XML 2004 Proceedings, each of which is hereby incorporated by reference.

Web services have become ubiquitous in nature in large-scale private and public networks due to the ease in which they may be interconnected so as to expose and utilize functionality of underlying network resources. However, the cost associated with maintaining and supporting web services by an enterprise or other entity can be significant, especially as the web services become increasingly interconnected.

SUMMARY

This disclosure is directed to improvements in SOA systems to provide both administrators of SOA systems and developers of web services with mechanisms to manage and control version updates for deployed web services. For example, according to the techniques of this disclosure, a Web Services Interface Revision Environment (WIRE) is described that provides a standard framework for maintaining web service version and dependency information across a complex web service deployment. The WIRE may include a dependency management module that may have access to a dependency database that is organized to store dependency information for a plurality of deployed web services. Information in the dependency database may be entered by a web service developer, or by an administrator or other user of the web service, or another user.

The dependency management module is communicatively coupled to an enterprise services bus (ESB) that provides a communication backbone for the plurality of web services of the SOA system. The dependency management module may receive an indication of a version update for a web service of the SOA, e.g., from a developer of the web service. In response to the indication, the dependency management module may access the dependency database and determine if the version update will modify operation of another web service of the SOA system. If the dependency management module determines that operation of one or more web services of the SOA system will be affected by the version update, at least one indication of the one or more affected web services may be communicated to a user. The dependency management module may further provide a user with other information such as usage statistics and domain information.

According to one example, a method of reporting dependency information for a service oriented architecture (SOA) system is described herein. The method includes receiving an indication of a version update for a first web service executable within an SOA system. The method further includes accessing, by a version control service, a database that stores dependency information for at least one second web service executable within an SOA system, wherein the dependency information indicates that the second web service depends at least in part on operation of the first web service executable within the SOA system. The method further includes determining, by the version control service based on the dependency information stored in the database, whether the version update for the first web service will cause a change to operation of the second web service if the version update is executed within the SOA system. The method further includes providing a user with at least one indication representative of the determination.

As another example, an article of manufacture comprising a computer-readable medium that stores instructions is described herein. The instructions are configured to cause a computing device to receive an indication of a version update for a first web service executable within an SOA system. The instructions are further configured to cause the computing device to access, by a version control service, a database that stores dependency information for at least one second web service executable within an SOA system, wherein the dependency information indicates that the second web service depends at least in part on operation of the first web service executable within the SOA system. The instructions are further configured to cause the computing device to determine, by the version control service based on the dependency information stored in the database, whether the version update for the first web service will cause a change to operation of the second web service if the version update is executed within the SOA system. The instructions are further configured to cause the computing device to provide a user with at least one indication representative of the determination.

As another example, a computing device is described herein. The computing device includes means for accessing a dependency control database that stores dependency information for at least one first web service executable within an SOA system, wherein the dependency information indicates that the first web service depends at least in part on operation of a second web service executable within the SOA system. The computing device further includes means for receiving an indication of a version update for the second web service executable within an SOA system. The computing device further includes means for determining whether the version update for the second web service will cause a change to operation of the first web service if the version update for the second web service is executed within the SOA system. The computing device further includes means for providing a user with at least one indication representative of the determination.

According to another example, a system for dependency information for a service oriented architecture (SOA) system. The system includes a dependency control database that stores dependency information for at least one first web service executable within an SOA system, wherein the dependency information indicates that the first web service depends at least in part on operation of a second web service executable within the SOA system. The system further includes a version control service that receives an indication of a version update for the second web service executable within an SOA system and determines whether the version update for the second web service will cause a change to operation of the first web service when the version update is executed within the SOA system, and provides a user with at least one indication of the determination.

The techniques described herein may provide one or more advantages. For example, use of the Web Services Interface Revision Environment (WIRE) described herein may decrease the expense and time required to maintain web services and ensure that the web service work reliably in spite of changes to other services with which they interact, regardless of whether the changed web services are local or external to the environment. That is, the techniques described herein allow web services within even the most complex, interconnected systems to be upgraded in a maintainable and efficient manner while providing the least system impact.

The WIRE described herein may benefit both service developers and service administrators. Service developers, i.e., programmers, may benefit because the techniques described herein allow them to smoothly maintain web service version control. Service administrators may benefit because WIRE may help them to assess any impact of launching a new version of a web service within their computing environment. In some cases, the WIRE described herein may provide a visual dependency graph to show how web services depend on each other and also provide helpful data, such as usage statistics, potential violations and domain information, to assist the administrator in determining the impact of deploying the new, executable version of a currently deployed and operational web service. Thus, service administrators may be able to make better informed decisions when deprecating or revising existing web services currently within their computing environment.

Further, by allowing administrators to identify and resolve potential violations and conflicts that may otherwise arise when upgrading a particular web service, the techniques may allow an enterprise to avoid the need to support legacy web services. For example, the techniques may allow the enterprise to avoid maintaining many backward compatible web services which may be costly as well as confusing for both existing clients and software developers.

The techniques of this disclosure may be advantageous, because an administrator or other user of web services of the SOA system may assess system impact of a new web service version without launching the new version. The techniques of this disclosure may be specifically advantageous for more critical SOA systems for which trial and error testing of web service version updates is undesirable.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 14 is a block diagram illustrating one example of a database schema that may be used to store dependency information consistent with the techniques of this disclosure.

DETAILED DESCRIPTION

Figure 1:
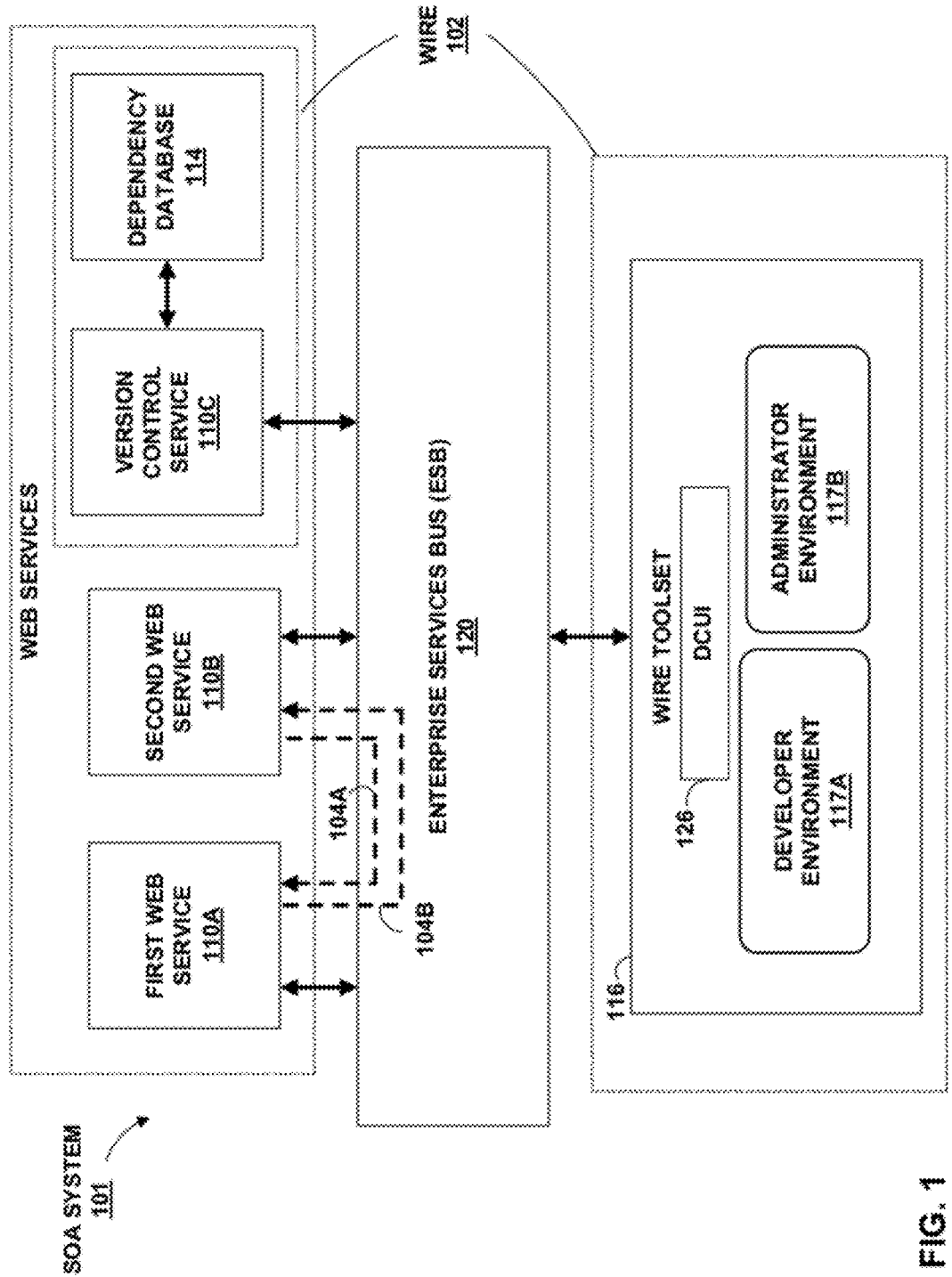
FIG. 1 is a block diagram illustrating one example of an arrangement of a service oriented architecture (SOA) system within which a version control system is implemented consistent with the techniques of this disclosure.

In general, this disclosure is directed to techniques for the management of web services in a service oriented architecture (SOA) system. Although an SOA architecture-based system may provide for platform-independent use of network accessible services as discussed above, such a system may be difficult to manage and/or implement, especially where a plurality of web services rely on one another for operation.

In some examples, it may be desirable for a developer of a web service to update a web service to a new version. In some examples, a new version of a web service may execute the same as a previous version, e.g., the new web service may continue to accept the same inputs, of the same format, and provide the same output in response to the same input as the previous version of the web service. However, in other examples, a new version of a web service may operate differently than another, previous version of the web service. For example, a new version of a web service may utilize different operations, accept different inputs or provide different outputs, modify the format, content, and/or protocol (e.g., data type) of inputs and outputs, or may otherwise operate differently than a previous version. Other examples of differences between web service versions include security updates, new mission requirements, different available data sets, bug fixes, application programming interface (API) improvements, policy changes, and the like.

Since an SOA system is developed with loose coupling between web services, e.g., the web services exchange information based on functionality and protocols, it may be difficult for a user of web services, or an administrator responsible for implementing web services, to determine what changes will occur if a new version of a web service is implemented. For example, where a new version of a web service causes a change in inputs accepted or output provided, the update may cause other web services of the SOA system to operate differently than originally intended, or to cease operation completely. According to known SOA systems, to determine what effect a new web service version will have on other services of the SOA system, a user may not determine whether a version update will cause a change in operation of other web services, unless the version update is executed within the SOA system. This approach may be undesirable in more critical government, military, commercial, and or industrial applications where non-operational web services can cause significant problems.

Upgrading a web service of an SOA system as described above may be costly and or inefficient, especially as an SOA system evolves and increases in complexity. For example, for some web services multiple versions of a service are maintained using a single, evolving interface. According to this example, service developers may preserve old operations and append new operations, and as a result of new operations data types (e.g., format of inputs and/or outputs) operation may change. Accordingly, web service developers may need to support old operation data types and new ones. Having multiple versions of a web service that represent the same abstract entity (e.g., a weather forecast web service) may be confusing for clients of the web service that may need to map between different versions depending on how the web service is used. A cost of maintaining and supporting older versions of web application data types may grow with each new version of the web service, and may become prohibitive.

Many SOA systems include web services that depend on information from other services to operate. For example, web service developer tools have recently become popular that create "mashups" of data sources and services, where functionality provided by a plurality of web services are presented to a user via the same user interface (e.g., accessible by the same uniform resource locator (URL)). Examples of such developer tools are Yahoo! Developer Network® and Yahoo! Pipes®. These composite services create exciting new functionality for end-users, however such composite services may be easily rendered inoperable because they depend on so many other web services. As services evolve, the complexity of dependencies between web services may increase, especially when translation services that translate web service output to a format for a specific other web service are used.

One approach to reduce an impact of version updates to web services on other, dependent web services is to keep all original operations of web services of an SOA system, e.g., do not allow version updates that will change in operation of other web services of the system. This approach may not be feasible in large distributed systems, because the number of operations and data types may grow out of hand and a service developer must continue supporting old versions of web services. Another approach to reduce an impact of version updates is to create an intermediary web service that acts as a translator between web services. According to this approach, requests made of an older web service version may be translated such that the requests may be understood by a newer version of the web service. For example, "older" requests may be identified by using XML namespaces to represent versions of a WSDL description or other SOA interface document. An intermediary service may act as a translation component that translates older requests/responses to current web service version requests responses.

Each of the approaches described above involve increased complexity and therefore costs to implement and maintain. The Web Services Interface Revision Environment (WIRE) described herein integrates with a SOA system and may reduce the costs associated with maintaining a complex set of interconnected web services and as well as any impact of a version updates may have on other web services of the SOA system.

FIG. 1 is a block diagram that illustrates one example of an arrangement of a service oriented architecture (SOA) system 101 into which a Web Services Interface Revision Environment (WIRE) system 102 has been integrated consistent with the techniques of this disclosure. As shown in FIG. 1, SOA system 101 provides an environment for executing a plurality of web services 110, i.e., first web service 110A and second web service 110B in this example. As shown in FIG. 1, web services 110A, 110B exchange information via enterprise services bus (ESB) 120, which defines a protocol for the exchange of information over a network between software applications such as web services 110. For example, web service 110A may issues XML-based messages to web service 110B using the Simple Object Access Protocol (SOAP) using HTTP or HTTPS to make use of the functionality provided by web service 110B. In this way, ESB 120 may provide a layer of abstraction for exchanging XML-based messages between web services 110.

In some examples, at least one of web services 110 may depend on another web service of SOA system 101 for operation. For example, as indicated by dashed line 104A in FIG. 1, second web service 110B may, via ESB 120, communicate a request for information from first web service 110A. In response to the request for information, as indicated by dashed line 104B in FIG. 1, web service 110B may, via ESB 120, communicate the requested information. In this manner, web service 110B may be considered to depend upon web service 110A for operation, e.g., web service 110B may utilize information from web service 110A via ESB 120 for operation.

WIRE system 102 as illustrated in FIG. 1 provides for version control functionality related to web services 110 of SOA system 101. That is, WIRE system 102 provides a standard framework for maintaining web service version and dependency information for web services 110. As depicted in FIG. 1, WIRE 102 includes a version control service (VCS) 112 that maintains versioning information and dependency data within a backend database 114, referred to as dependency control database (DCD). In addition, WIRE 102 includes a front-end WIRE toolset that provides various environments to assist both developers and administrators. The framework of WIRE 102 is designed to be extensible and scalable to many SOA enterprise environments. For example, VCS 110C may be built as a standard SOAP-based web service that will store version information and dependencies in database 114. As such, VCS 110C can be plugged into and existing ESB, and immediately be used via WIRE toolset 116. WIRE 102 is platform and ESB independent to work in many different enterprises.

After developers edit existing or create new version information, the data will be sent to the VCS 110C. When administrators request a list of dependencies for some particular operation of a particular service, VCS 110C will respond with the corresponding results. In general, there may be two classes of potential users of WIRE system 102, web service administrators, and web service developers. The phrase web service administrator refers to one or more users responsible for administration of an SOA system 101. The one or more administrators may be responsible for ensuring that web services 110 of SOA system 101 function as expected. For example, a web service administrator may be responsible for ensuring that one or more web services 110 of an SOA system 101 continue to function as expected when a version update for a web service is installed.

In general, WIRE toolset 116 includes software functions that provide two environments for assisting users: a developer environment 117A for assisting service developers and an administrator environment 117B for service administrators. In most enterprise environments, the developer roles will be different than the administrator role, but in smaller deployments they could be the same person or persons. Developer environment 117A allows developers to maintain version information as they make programmatic changes in deployed web services 110 currently identified to WIRE system 102. This includes SOAP-based web services that utilize WSDL interfaces as well as other SOA services. Developer environment 117A also allows developers to add historical version information to existing services which have not been previously used with WIRE system 102.

Administrator environment 117B allows service administrators to efficiently assess any system impact before removing any of web services 110 in a system-of-systems context. The administrator can assess the impact by visually examining the dependencies for a particular operation in a dynamic graph drawn by WIRE 102. The graph may contain other beneficial data, such as usage statistics for each dependency, as gathered by the ESB, and user-supplied system impact ratings to help the administrator determine the appropriate action to take when deprecating services.

The phrase web service developer refers to one or more users responsible for development and/or management of one or more web services 110A, 110B. For example, a web service developer may write software code to define web service functionality. A web service developer may further implement new versions of a web service 110A, 110B, and/or maintain older versions of a web service.

In some examples, the various functionality and components of WIRE system 102 are described herein as directed to specific web service developer and administrator users. However, in some circumstances, a web service developer may be the same user or group of users as a web service administrator. For example, a user or group of users responsible for management of a SOA system 101 may also develop and/or manage one or more web services 110 of SOA system 101. In other examples, a web service developer may desire to utilize functionality described herein as directed towards an administrator. Description of the various aspects of WIRE system 102 as directed towards web service developers and/or web service administrators is provided for exemplary purposes only, and is intended to be non-limiting. Any user may utilize any functionality of WIRE system 102 as described herein.

WIRE toolset 116 includes a dependency control user interface 126, which provides an interface by which one or more users, such as web service developers and administrators, access functionality provided by version control service 112 and DCD 114. According to one example, dependency control user interface (DCUI) 126 enables a user, such as a web service developer, to submit to WIRE 102 dependency information for at least one web service and/or one or more version of a web service. According to one example, DCUI 126 may communicate received information to VCS 110C for storage in DCD 114.

DCUI 126 and/or VCS 110C may also or instead be operative to provide dependency information to one or more users. For example, DCUI 126 may, in response to a request for information from a user, communicate with VCS 110C to access information stored in DCD 114 to determine and/or provide requested dependency information to one or more users. As one example, DCUI 126 may receive an indication of a version update for a first web service 110A executable within an SOA system. DCUI 126 may communicate an indication of the version update to VCS 110C. In response to the received version update, VCS 110C may access DCD 114. DCD 114 stores dependency information for at least one second web service 110B executable within the SOA system 101. For example the dependency information may indicate that second web service 110B depends at least in part on operation of first web 110A service.

VCS 110C may further determine, based on the dependency information stored in DCD 114, if a version update for first web service 110A will cause a change to operation of second web service 110B when the version update is executed within SOA system 101. If the version update will cause a change to operation of second web service 110B when the version update for first web service 110A is executed within the SOA system 101, VCS 110C provides a user with at least one indication that the version update to the second web service 110B will cause a change to operation of the at least one first web service 110A.

According to one example, if the version update to the first web service 110A will cause a change, at least one message (e.g., an RSS feed, email, text, tweet, telephone call, page, alarm, or the like) may be communicated to one or more users, such as developers of one or more web services executable within the SOA system 101 and/or administrators of one or more SOA systems 101.

According to another example, DCUI 126 may receive from a user a request to receive dependency information for a specific one or more of web services 110 of SOA system 101. For example, a user may request, via DCUI 126, dependency information for a web service, or a particular version of a web service. In response to the request, DCUI 126 may issue SOAP calls to VCS 110C to access information stored in DCD 114. VCS 110C may determine, based on the stored information, what web services depend on the requested web service. Also in response to the request, VCS 110C may provide a user with at least one indication of forward and/or backward dependencies for the at least one requested web service or web service version. In one example, the at least one indication of forward and/or backward dependencies is a graph or chart depicting what web services the request web service depends on for operation, and/or what web services depend on the requested web service. In another example, the indication includes a textual description of forward and/or backward dependencies of a web service or web service version.

According to another example, DCUI 126 may receive from a user a request to receive dependency information for the entire SOA system 101. In response to the request, DCUI 126 may communicate with VCS 110C to access information stored in DCD 114. VCS 110C may determine, based on the stored information, which web services of the SOA system 101 depend on one another. Also in response to the request, VCS 110C may provide a user with at least one indication of forward and/or backward dependencies for a plurality of web services of SOA system 101. In one example, the at least one indication is a graph or chart that depicts inter-dependencies between web services of the SOA system 101. In another example, the at least one indication is a textual description of dependencies of the SOA system 101.

Figure 2:
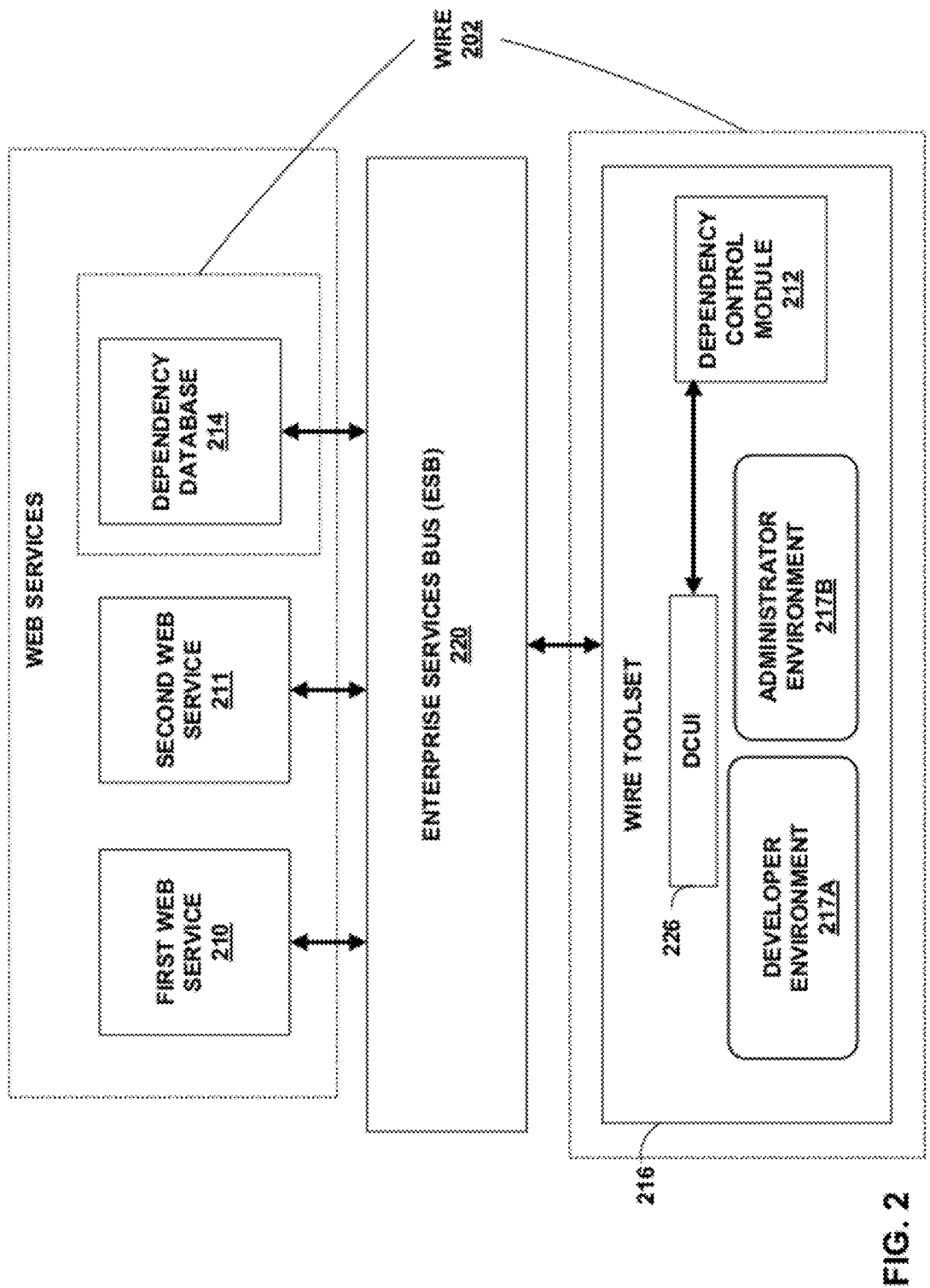
FIG. 2 is a block diagram illustrating another example of an arrangement of a service oriented architecture (SOA) system within which a version control system is implemented consistent with the techniques of this disclosure.

FIG. 2 is a block diagram that illustrates another example of an arrangement of a service oriented architecture (SOA) system 201 that includes a Web services Interface Version Environment (WIRE) system 202 consistent with the techniques of this disclosure. SOA system 201 illustrated in FIG. 2 is substantially similar to SOA system 101 depicted in FIG. 1, however unlike VCS 110C of SOA 101, VCS 212 of SOA 202 is part of WIRE toolset 216. According to this example, VCS 212 communicates with dependency database 214 to access stored dependency information via ESB 220. Similarly, DCUI 226 may communicate with VCS 212 local to a computing device upon which DCUI 226 is operating, instead of via ESB 220 as shown in FIG. 1. In one example consistent with SOA 201 of FIG. 2, program instructions defining functionality of WIRE toolset 216 may be written in a programming language such as the JavaScript® programming language.

Figure 3:
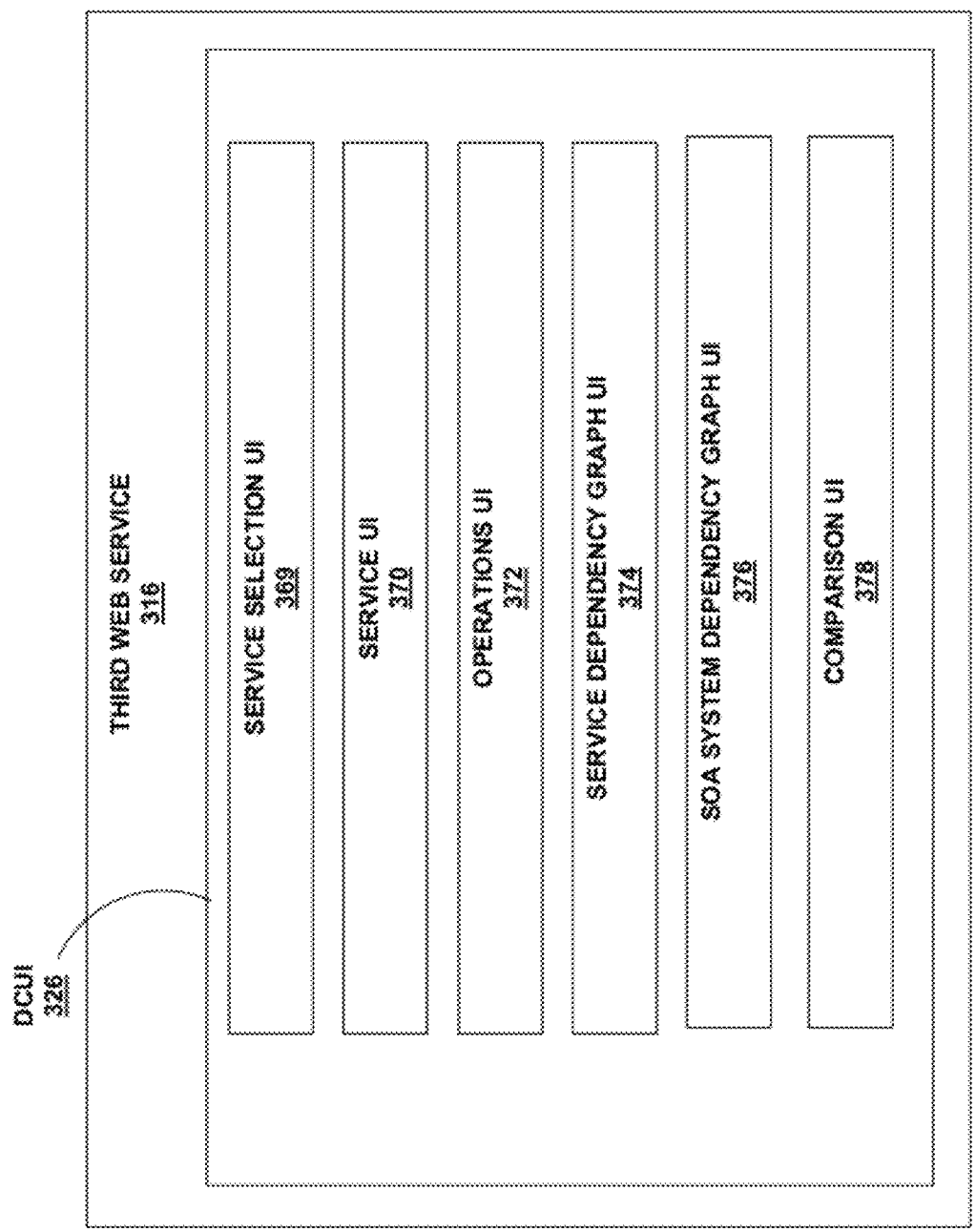
FIG. 3 is a block diagram illustrating a dependency control user interface that includes plurality of other user interfaces consistent with the techniques of this disclosure.

FIG. 3 is a block diagram that illustrates one example of user interfaces that may be provided to users, e.g., via a DCUI 326 (such as DCUI 126 illustrated in FIGS. 1 and 2), consistent with the techniques of this disclosure. As mentioned above, access to the various functionality of a WIRE system 101, 201 as described herein may be provided via single user interface for both developers and administrators, or may be provided as independent developer and administrator user interfaces. FIG. 3 illustrates one specific example, where a single DCUI 326 is provided that may be utilized by either developers or administrators.

According to other examples not depicted separate user interfaces may be provided for the different forms of functionality described with respect to the various user interfaces 326, 372, 374, 376, 378 depicted in FIG. 3. Furthermore, the various user interfaces described herein may be provided to a user via one or more WIRE toolset 316, via one or more desktop applications, or any other mechanisms for providing a user interface configured to communicate via a network.

As shown in FIG. 3, DCUI 326 includes a service selection UI 369. Service selection UI 369 may enable a user to select one or more services 110 of an SOA system 101, 201. For example, service selection UI 369 may include one or more file browsers, drop down menus, or like mechanisms to enable a user to select one or more services 110 of an SOA system 201. User selection of one or more services 110 may cause other UI of DCUI 326 described herein to display information related to one or more selected web services 110 for viewing or editing.

Figure 14:
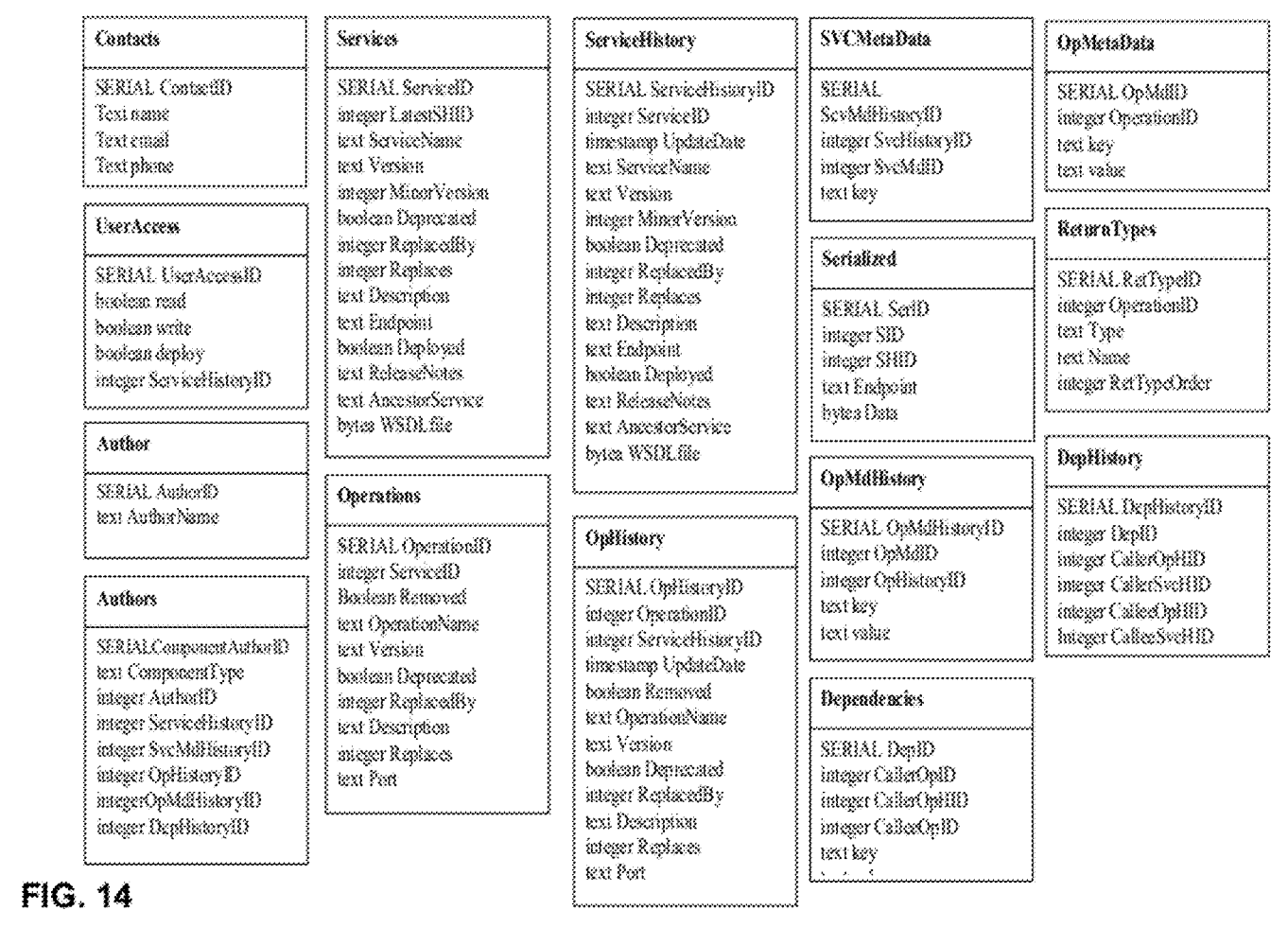
Figure 15:
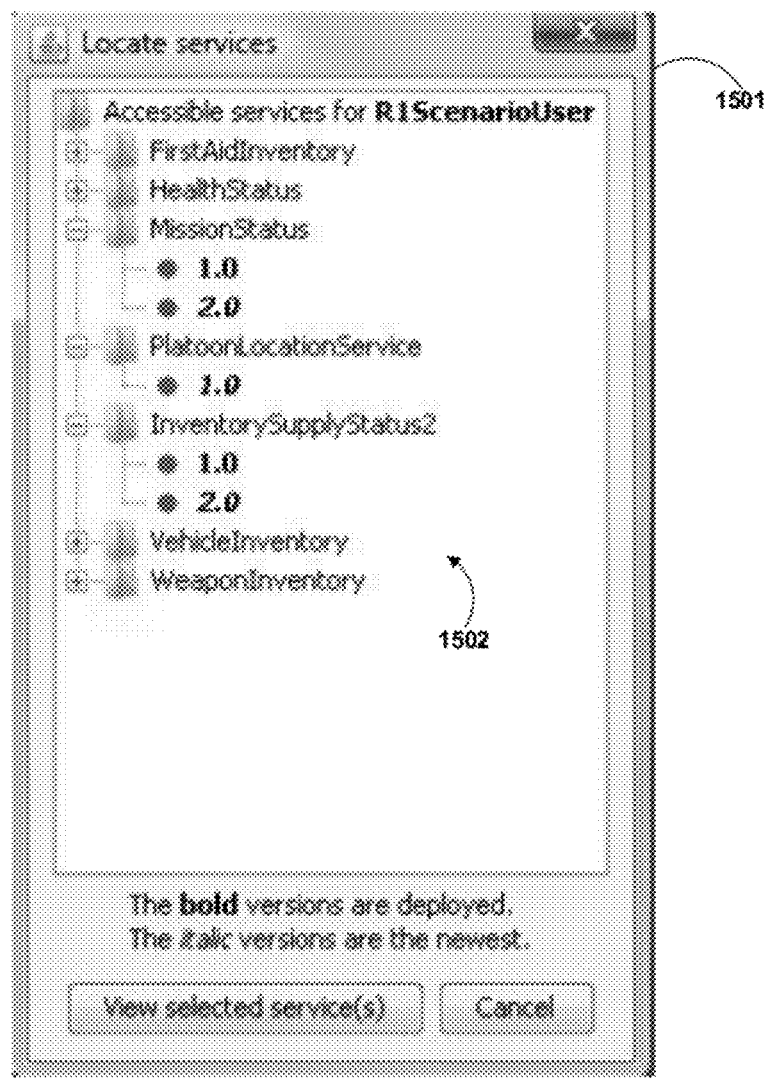
FIG. 15 is a screen shot diagram that illustrates one example of a service selection user interface consistent with the techniques of this disclosure.

FIG. 15 illustrates one example of a service selection UI 369, service selection UI 1501. As shown in FIG. 15, service selection UI 1401 includes a user-selectable directory structure tree 1502 is provided that allows a user to select one or more web services 110 of an SOA system 101, 201. In the FIG. 14 example, directory structure tree 1502 enables user selection from among a plurality of web services and corresponding versions for an SOA system titled "RScenarioUser." User selection of one or more web services via directory structure tree 1502 may cause information regarding the selected one or more services to be displayed to a user, e.g. as described with respect to the various examples of user interfaces of this disclosure.

As depicted in FIG. 3, DCUI 326 includes a service UI 370. Service UI 370 may provide a user with a user interface to submit information, such as dependency information, to a WIRE system, or view information provided by a WIRE system. For example, service UI 370 may enable a user to submit, select or view a name of one of the services 110 of an SOA system and a version for that service. Service UI 370 may further enable a user to submit or select a categorization for a service or service version, e.g., whether a service or version is currently deployed (e.g., executed within an SOA system), deprecated (e.g., an outdated version that still functions, but for which a more recent version should possibly be used), broken (e.g., not operating at all, such as not providing any output), or deactivated (not useable).

Service UI 370 may further enable a user to submit a location, or endpoint, where a service may be accessed, such as a uniform resource locator (URL) where the service may be accessed via a network such as the Internet. Service UI 370 may further enable a user to enter release notes for a web service, or a version of a web service. Submitted release notes may indicate a difference, such as an operational, functional, or other difference, between a web service version and other version of the web service. Service UI 370 may further allow for other forms of information relating to a web service or version of a web service, such as ancestry of a web service (e.g., a project upon which a web service or version is based) and/or contact information for one or more developers and/or administers responsible for developing and/or maintaining a web service or web service version. Service UI 370 may further enable a user to define custom metadata for a web service or web service version.

The various information described above that may be submitted by a user according to service UI 370 may be communicated to a version control service (e.g., VCS 110C, 212) and stored in a dependency control database (e.g., DCD 114, 214) as described above with respect to FIGS. 1 and 2. Such stored dependency information may be accessed and provided to a user. For example, such dependency information may later be accessed to determine forward/backward compatibility for a new version of a web service. If a new version of a web service will cause a change in operation of another web service of an SOA system when executed, an indication of the change may be provided to a user.

A described above, service UI 370 may enable a user, such as a web service developer, to submit various information regarding a web service to WIRE system 102, 202. A service UI 370, or any other UI described herein, may also or instead enable a user to view information previously entered regarding a particular web service or web service version. According to one such example, a service UI 370 may be provided to web service developers in an editable format, where a user may freely modify one or more fields or select from among options according to pull-menus, selectable buttons, and the like that representing the various types of information described above.

According to a related example, the same or substantially the same service UI 370 may be provided to web service administrators, however much of the above-described information may be presented in a read-only format. In another example, a service UI 370, or any other UI described herein, may be editable by both administrators and developers. In other examples, different service user interfaces may be provided to administrators and/or developers. For example, an administrator may be provided with a subset of information available to developers, or vice versa.

Figure 4:
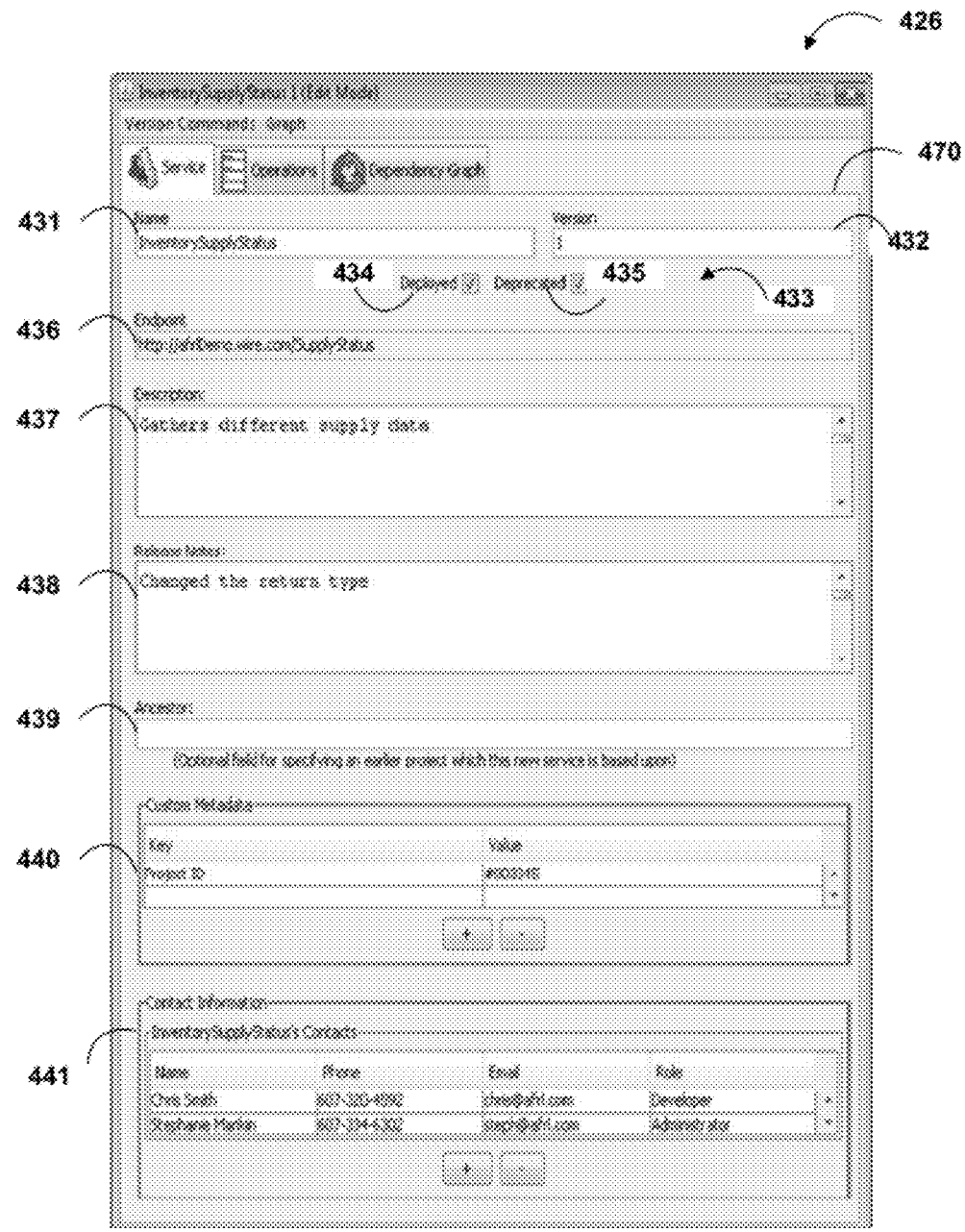
FIG. 4 is a screen shot diagram that illustrates one example of a web service user interface consistent with the techniques of this disclosure.

FIG. 4 illustrates one specific example of a service UI 470 of a dependency control user interface, such as DCUI 370 of FIG. 3. The illustrated service UI 470 is merely one example implementation of a service UI 370 as depicted in FIG. 3, and is intended to be non-limiting. As shown in FIG. 4, service UI 470 includes a name field 431. Name field 431 enables a user to view, assign, or change a name of a web service ("InventorySupplyStatus" in the example of FIG. 4). Service UI 470 further includes version field 432. Version field 432 may indicate a selected version of a web service. According to the screen shot example of FIG. 4, a user is viewing information regarding a first version, version 1, of a web service titled InventorySupplyStatus.

Service UI 470 further includes categorization fields 433, including deployed field 434 and deprecated field 435. Deployed field 434 is selectable by a user to indicate whether a version of a web service indicated in version field 482 is currently deployed in SOA system 101, 102. Deprecated field 435 is selectable by a user to indicate whether a web service version is deprecated (e.g., an outdated version that is still functional, but for which a more recent version should possibly be used). In other examples not depicted in FIG. 4, categorizations fields 433 include other categories for one or more web services, such as whether a service or version is currently deployed (e.g., executed within an SOA system), or broken (e.g., not operating at all, such as not providing any output), or deactivated (e.g., not useable).

UI 470 further includes an endpoint field 436. Endpoint field 436 enables a user to submit or view a network location where a web service, and/or version of a web service, may be found. According to the example of FIG. 4, the "InventorySupplyStatus" web service may be accessed via the URL http://afrlDemo.wire.com/SupplyStatus. UI 470 further includes a description field 437. Description field 437 enables a user to submit or view a description of functionality provided by a web service. According to the example of FIG. 4, description field 437 indicates that the InventorySupplyStatus web service is "operable to gather different supply data." UI 470 further includes a release notes field 438. Release notes field 438 enables a user to submit or view what has changed with a version of a web service indicated by version field 432, such as a textual description of a change. For example, release notes field 438 in the example of FIG. 4 indicates that version 1 of the InventorySupplyStatus web service is changed in light of one or more previous versions to "change the return type."

Service UI 470 further includes an ancestor field 439. Ancestor field 439 may enable a user to indicate or view a prior project, such as another web service, that may have provided a basis for the web service indicated by field 431 and/or a particular version of a web service indicated by version field 432. Service UI 470 further includes custom metadata fields 440. Custom metadata fields 440 enable a user to submit or view custom data that may be assigned to a web service or web service version. For example, using a custom metadata field, a web service developer or administrator may label a web service or version according to an internal company or government department identification. For example, as shown in FIG. 4, custom metadata fields indicate that a user has assigned the InventorySupplyStatus web service, version 1, with a project number "#0003345." Custom metadata entered using custom metadata field 440 may be used to, for example, interface with other software systems inside or outside an SOA system to provide company and/or department specific reports regarding the SOA system, web service, group of web services, or versions. Service UI 470 further includes a contact information field 441. Contact information field 441 may be used to submit or view contact information for one or more users associated with a web service or version, such as web service developers and/or SOA system administrators. As shown in the example of FIG. 4, contact information has been submitted for developer "Chris Smith", and Administrator "Stephanie Merkin."

Referring back to FIG. 3, a DCUI may further include operations UI 372. Operations UI 372 may be used to view or submit information regarding operations performed by a web service or version. For example, operations UI 372 may allow a user to select from among a group of operations supported by a selected web service or version. Operations UI 372 may further allow a user to select from among inputs or outputs (e.g., data types) of a particular operation of a web service or version. Operations UI may further enable a user to select one or more categorizations of a particular operation input/output o of a web service or version. For example, operations UI 372 may enable a user to submit selection of whether an operation or input/output is, deprecated. Operations UI 372 may further enable a user to submit a description of a particular input/output of a web service or version, such as a description of what value and/or in what format values are communicated.

Operations UI 372 may further enable a user to submit or view one or more other operations and/or inputs/outputs, e.g., of the same service or version, or of a different service or version of a service, upon which a particular operation depends. For example, operations UI 372 may include a textual list or graphical indication of depending operations and/or inputs/outputs, and their associated web service or web service version.

Figure 5:
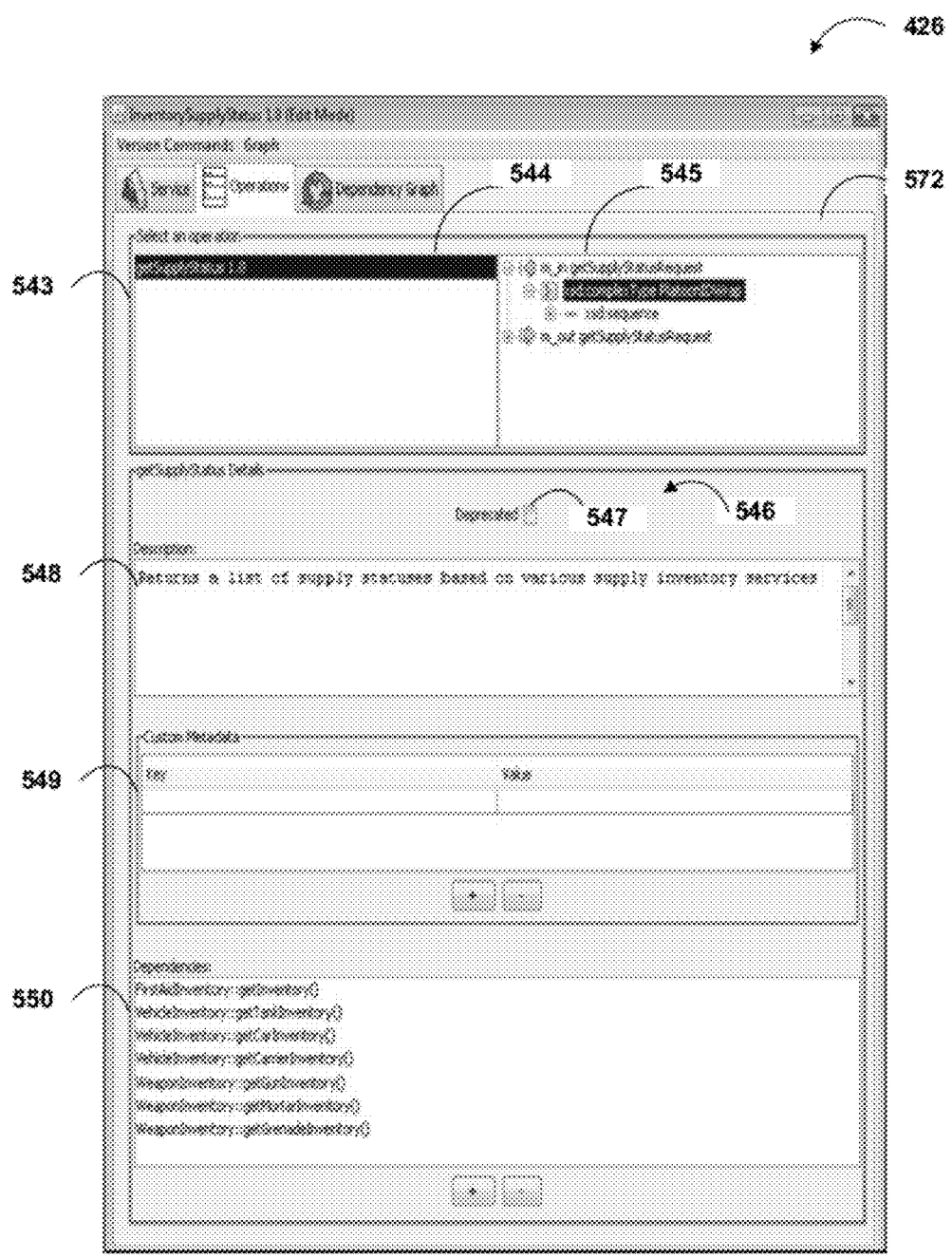
FIG. 5 is a screen shot diagram that illustrates one example of an operation user interface consistent with the techniques of this disclosure.

FIG. 5 is a screen shot diagram that illustrates one non-limiting example of an operations UI 372, operations UI 572. As shown in FIG. 5, operations UI 572 includes an operation selection field 543. Operation selection field 543 includes a first window 544 that enables a user to select from among a plurality of operations of a web service or version (e.g., selected using service UI 370). In the example of FIG. 5 only one operation is shown, version 1 of "getSupplyStatus." Operation selection field further includes an input/output selection window 545. Selection window 545 enables a user to select one or more inputs or outputs (e.g., xml schema data types) of an operation selected via first window 544. According to the example of FIG. 5, the data type "xsd:complexTypePlatoonIDWrap" has been selected by a user. Selection of one or more operations or inputs/outputs presented in operation selection field 542 may cause other fields of operations UI 572 to change displayed information, for example those fields discussed below with respect to FIG. 5.

Operations UI 572 further includes an operation categorization field 546. Operation categorization field 546 enables a user to select one or more categorizations of a particular operation or inputs/outputs of a web service or version. According to the example of FIG. 5, a "deprecated" selectable check-box 547 is presented to a user for selection. The "deprecate" check-box 547 may indicate that a particular operation and/or input/output is not functioning as intended, for example to indicate that an operation and/or input/output selected in operation selection field 542 only works under certain circumstances, or provides some output but not others. According to other examples not shown in FIG. 5, operations UI 372 may enable a user to submit selection of whether an operation or input/output is deprecated (e.g., an outdated operation or input/output that is still functional, such as one for which a more recent version of the operation or input/output should possibly be used).

UI 572 further includes a description field 548. Description field 548 indicates a description of functionality provided by an operation or input/output of a web service, such as a return value for the operation. According to the example of FIG. 4, description field 548 indicates that the operation or input/output selected at operation selection field 542 is "Returns a list of supply statuses based on various supply inventory services.

Operations UI 572 further includes custom metadata fields 549. Custom metadata fields 549 enable a user to select custom data that may be assigned to an operation or input/output of a web service or web service version. For example, using custom metadata field 548, a web service developer or administrator may label a an operation or input/output according to an internal company or government department identification. Operations UI 572 further includes dependencies field 550. Dependencies field 550 provides a user with a textual description of one or more web service operations upon which an operation selected at operation selection field 543 depend. According to the example of FIG. 5, operation getSupplyStatus version 1.0 depends on one operation of web service FirstAidInventory, three operations of web service VehicleInventory, and three operations of web service WeaponInventory. In other examples not depicted in FIG. 5, operations UI 572 may further include one or more indications of what other operations, either of the same web service or different web service, depend on an operation or input/output selected at operation selection field 543.

Referring back to FIG. 3, DCUI 326 may further include a service dependency graph UI 374. Service dependency graph UI 374 may provide a user with a graphical representation one or more of backward and forward dependencies for a particular web service, web service version, operation, or input/output of a web service. For example service dependency graph may provide, for a particular web service, version, operation, or input/output, a graphical backwards dependency graph that indicates what web services and/or versions of a web service depend on a selected web service (e.g., that invoke the selected web service). The graphical backwards dependency graph may further indicate, for example via color, shape, text, or line/arrow formatting or other graphical indication, whether a web service or version will not operate as expected if a selected web service is executed For example, the graphical backwards dependency graph may indicate whether one or more web services or version that depend on a selected web service will not operate as expected, e.g., because the web service or version that depends on the selected web service is not configured to receive one or more outputs or output formats (e.g., data types) of the selected web service. As an example, the graphical backwards dependency graph may indicate that a selected or other web service is deprecated, or possibly should be updated.

Service dependency graph UI 374 may further provide a user a graphical forward dependency graph that indicates what web services/version a selected web service depends on (e.g., that the selected web service invokes). The graphical forward dependency graph may indicate, for example via color, shape, text, or line/arrow formatting or other graphical indication, whether a selected web service will not operate as expected if another web service is executed, for example whether a selected web service is deprecated, or possibly should be updated.

In some examples a service dependency graph UI may include one or more indications in addition to those described above. For example, a service dependency graph may indicate, in addition to whether operation of forward or backward dependent services will change due if a selected web service version is executed in an SOA system, a categorization of a change that would be caused in the selected web service were executed. For example service dependency graph 374 may indicate whether a change to the selected web service would render the selected web service version, or one or more web service dependent on the selected web service version, whether operation of the web service will change, whether the web service will be deprecated, or whether the web service will cease operation entirely. In addition, service dependency graph may further graphically indicate what operations or inputs/outputs of web services will cease to operate as intended, or altogether, if a selected web service is executed within an SOA system.

Figure 6:
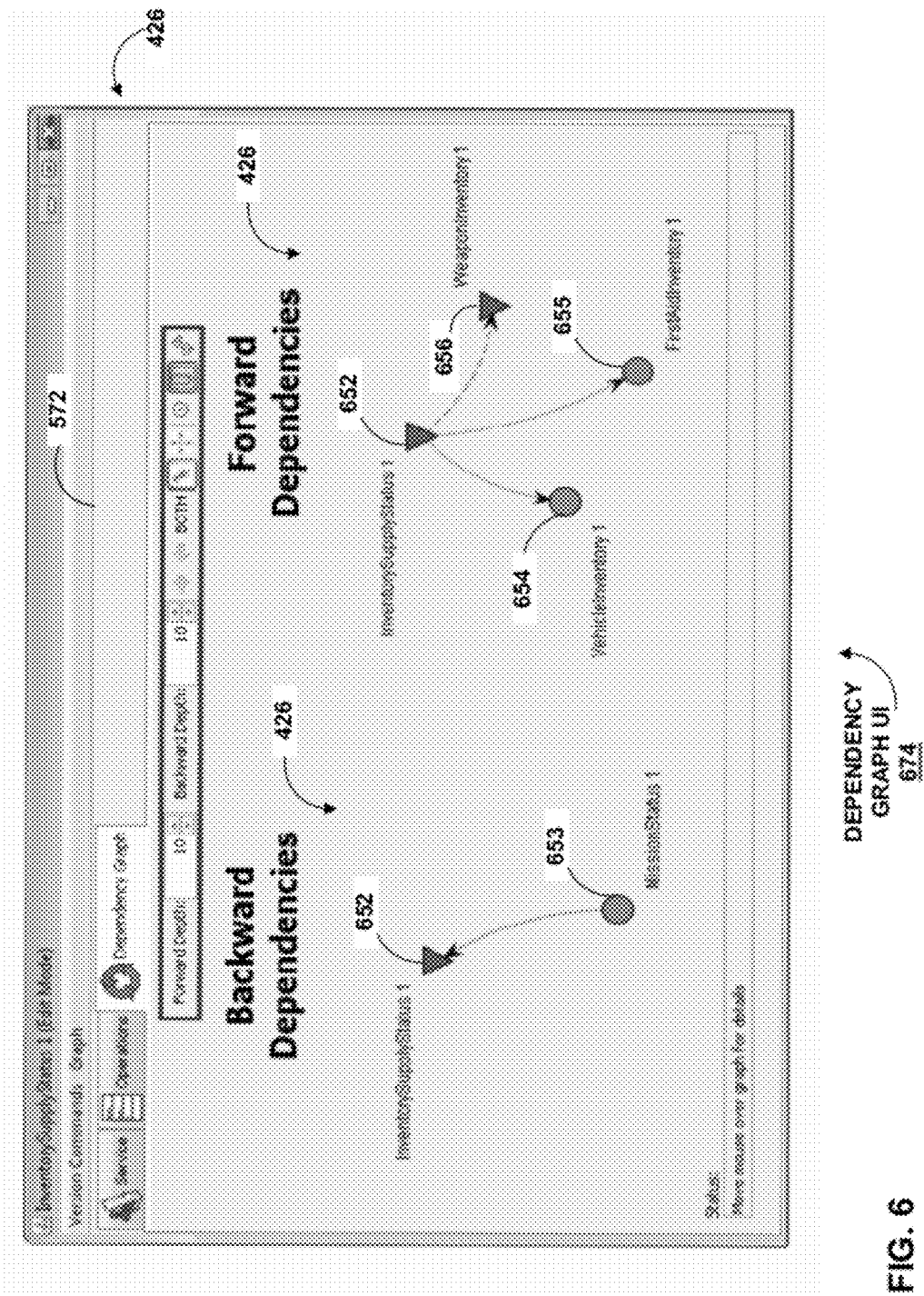
FIG. 6 is a screen shot diagram that illustrates on example of a dependency graph user interface consistent with the techniques of this disclosure.

FIG. 6 is a screen shot diagram that illustrates one non-limiting example of a service dependency graph 674 consistent with the techniques of this disclosure. Dependency graph 674 includes a backward dependency graph 659 and a forward dependency graph 651. Backward dependency graph 659 includes a graphical indication of one or more other services that depend on (e.g., invoke) a selected service, "Inventory Supply" service, version 1, as indicated by triangle 652. In the example of FIG. 6, as indicated by an arrow between services 652, 653, web service 653 depends on (e.g., invokes) selected web service 652. As also shown in the FIG. 6 example, web service 652 is represented by a triangle shape, while web service 653 is represented by a circle. The circle may indicate that web service 653 is currently deployed and operating as expected, while the triangle may indicate that web service 652 is deprecated. Thus, backward dependency graph 659 may indicate that web service 652 should possibly be updated.

Forward dependency graph 651 includes a graphical indication of one or more web services 654, 655, and 656 that selected service 652, Inventory Supply, depends on (e.g., invokes). In the example of FIG. 6, service 652 depends on services 654, 655, and 656. As shown in FIG. 6, web services 652 and 656 are represented by a triangle shape, while web services 654 and 655 are represented by a circle. The circle may indicate that web services 654 and 655 will continue executing as expected or desired if web service 652 is executed, while the triangle may indicate that web service 654 may not operate as expected or desired (e.g., web service 654 is deprecated, meaning SOA system should possibly use a different version of web service 564) if web service 652 is executed. According to this example, a user may quickly verify that, if web service 652 were to be executed, web service 654 may be broken and/or should possibly be updated.

Referring back to FIG. 3, DCUI 326 may further include a SOA system dependency graph UI 376. SOA system dependency graph UI 376 provides a user with a graphical indication of dependencies, such as forward and backward dependencies, between various services of an SOA system. For example, SOA system dependency graph UI may include one or more icons that represent a plurality of services of an SOA system. SOA system dependency graph UI 376 may indicate what services are dependent on other services, and/or what services are currently operating as expected or desired, or not. SOA system dependency graph UI 376 may further indicate a categorization of one or more web services, such as whether they are operating as expected or desired, partially operating, or not operating as expected or desired.

Figure 7:
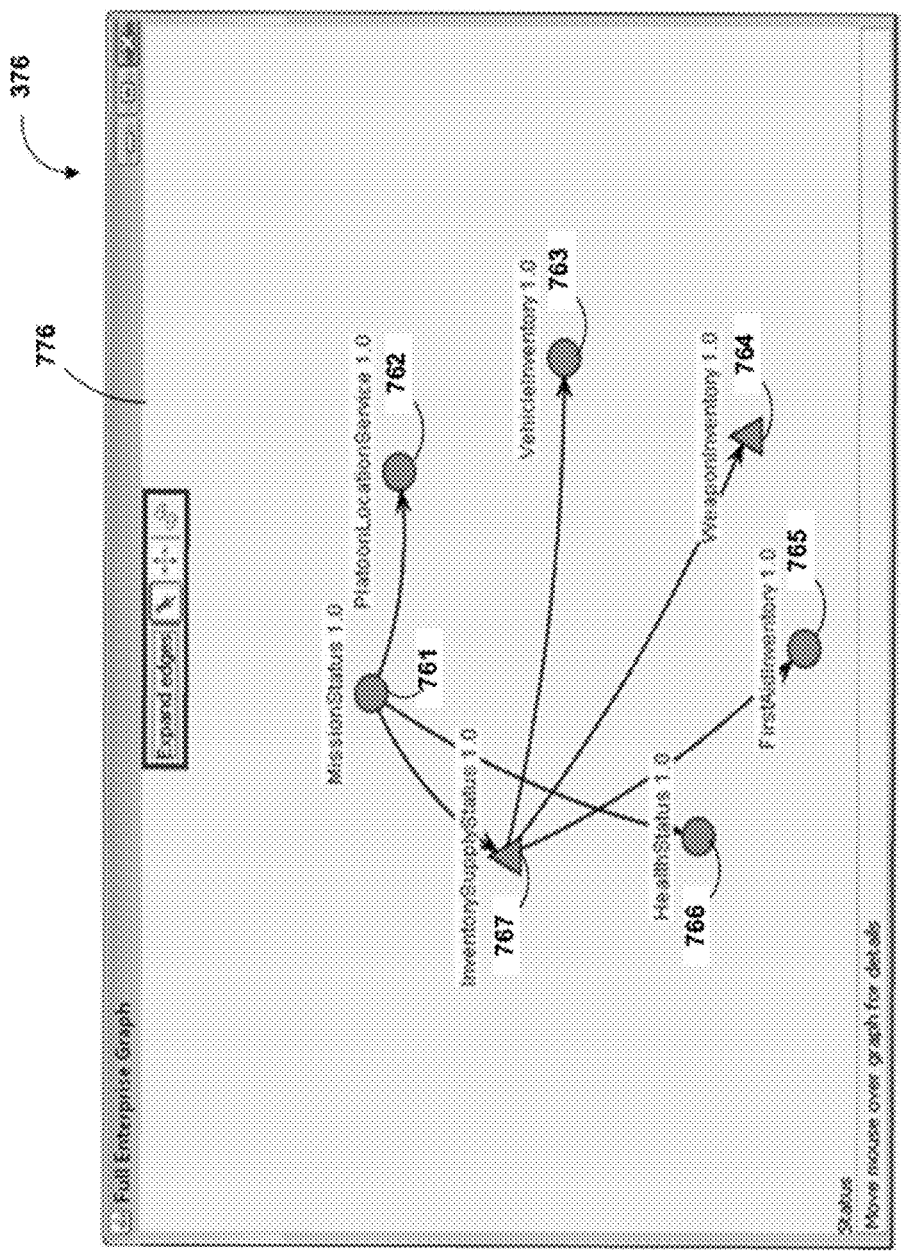
FIG. 7 is a screen shot diagram that illustrates one example of an SOA system dependency graph user interface consistent with the techniques of this disclosure.

FIG. 7 is a screen shot that illustrates one non-limiting example of a SOA system dependency graph UI 376, SOA UI 776. SOA UI 776 depicts a plurality of web services 761-767 of an SOA system. As shown in FIG. 7, services 764 and 767 are represented by a triangle shaped icon, while services 761-763 and 765-767 are represented by circular shaped icons. The triangle shaped icons may indicate that services 764 and 767 may not operate as expected in the SOA system (e.g., are deprecated and should possibly be updated), while the circle shaped icons may indicate that services 761-763 and 765-767 will operate as expected or desired. Accordingly, a user may utilize SOA UI 776 to readily determine a current state of an SOA system in general, such as whether any services of the SOA system are deprecated.

Referring back to FIG. 3, DCUI 370 may further include a comparison UI 378. Comparison UI 378 may provide a user with a mechanism to compare dependency and/or other information regarding at least two web services or versions of a web service. For example, comparison UI 378 may enable a user to select at least two web services or versions to compare. In response to the user selection, comparison UI 378 may present one or more operations and/or inputs/outputs shared between the selected web services, and whether the shared operations and/or inputs/outputs operate the same or not. For example, comparison UI 378 may indicate one or more data inputs or outputs of operations of each web service operation, and or whether those inputs/outputs are different between the two selected web services or version.

Figure 8:
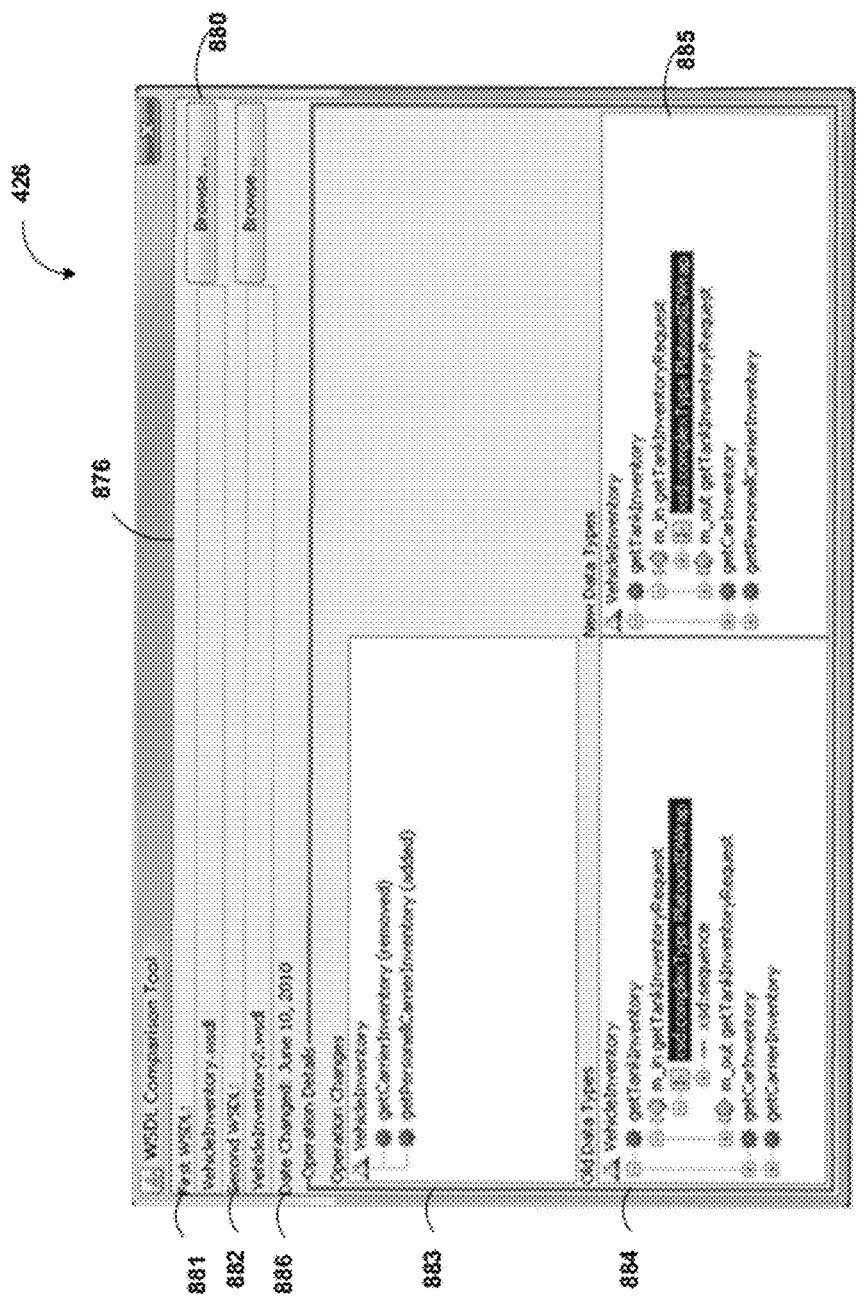
FIG. 8 is a screen shot diagram that illustrates one example of a comparison user interface consistent with the techniques of this disclosure.

FIG. 8 is a screen shot that illustrates one non-limiting example of a comparison UI 378, comparison UI 878. As shown I the example of FIG. 8, comparison UI 878 includes a first web service description language (WSDL) file selection field 880 and a second WSDL selection field 881. Each of fields 880, 881 includes a "Browse" button that enables a user to browse a directory system to access dependency and/or other information for first and second web services or versions of a web service. According to this example, in field 880 a user has selected version 1 of a service named "VehicleInventory", and in field 881 a user has selected version 2 of a service named "VehicleInventory."

As also shown in FIG. 8, comparison UI 878 further includes an operation change field 882 and a change date field 886. Operation change field 882 may indicate to a user what operations have changed between first and second web services selected at fields 880 and 881. According to the example of FIG. 8, operation change field indicates that differences between the respective versions of "VehicleInventory" include the deletion of an operation titled "GetCarrierInventory of version 1, and the addition of an operation titled "GetPersonellCarrierInventory" in version 2. Change date field 886 may indicate a date at which a change indicated by operation change field 882 occurred, for example when an indication of a new web service, e.g., version 2 of the web service "VehicleInventory" as show in FIG. 1 was submitted.

As also shown in FIG. 8, comparison UI 878 may also include input/output (e.g., data type) review fields 884 and 885. Fields 884 and 885 allow a user to browse a hierarchy chart depicting operations and/or inputs/outputs of the web services selected at WSDL fields 880 and 881. The hierarchy chart of fields 884, 885 allow users to select and view differences between operations and/or inputs/outputs. For example, UI 878 shows a user has selected the data type "sxd:ComplexType:PlatoonIDWrap" in one or more of fields 884 and 884. UI 878 indicates to a user that the selected data types are the same in both version 1 and version 2 of the VehicleInventory web service. In other examples, UI 878 may provide an indication that the data types are not the same between web services selected for comparison. For example, UI 878 may present dissimilar data types in a different color, or font, than the same or similar data types.

As discussed above, in addition to providing one or more users with one or more user interfaces, such as UI 326 depicted in FIG. 3, WIRE system 102, 202 may be configured to provide users with one or more message alerts, if a change occurs for a web service and/or an SOA system. For example, WIRE system may, upon receipt of an indication of a new web service version, VCS 110C, 212 may access DCD 114, 214 determine if a change to any other web services of the SOA system will be caused if the new version is executed within the SOA system. In one example, such a message may merely indicate to a user that a change has occurred. In other examples, such a message may provide a user with details regarding the change (e.g., for what web service was the indication received, who submitted the change), what web services/versions operation will be effected if the new version is executed within the SOA system, and/or what operations, inputs/outputs, and/or data types have changed with the new version. In one example, such a message may be communicated to a user via a Really Simple Syndication (RSS) message. According to other examples, such a message may be communicated according to email, text message, pager, telephone or computer based alarm, or any other technique for communicating a message to a user.

Figure 9:
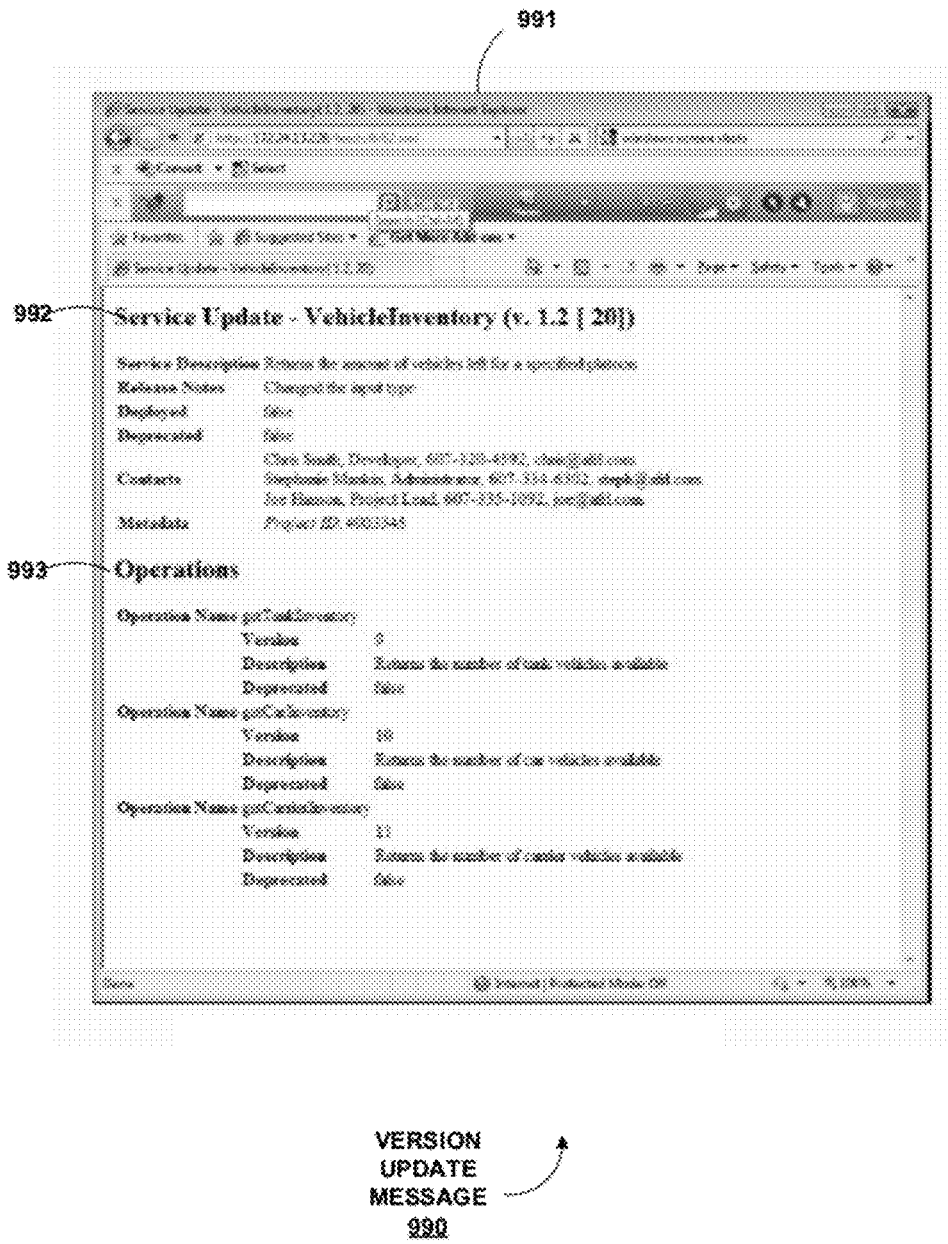
FIG. 9 is a screen shot diagram that illustrates one example of a message indicating a version update consistent with the techniques of this disclosure.

FIG. 9 is a screen shot example of a message that may be communicated by a VCS 110C, 212 of a WIRE system 101, 202 consistent with the techniques of this disclosure. VCS 110C, 212 may communicate the depicted message in response to receiving an indication of a new version of a web service of an SOA system 101, 201. For example, VCS 110C, 212 may communicate an RSS message to a user to notify a user of the change.

Message 991 includes service update information 992 and operations information 993. Service update information 992 indicates to a user various information regarding a service update. For example, message 991 include an indication of a description of an updated service, release notes for the updated service, whether the service is categorized as deployed and/or deprecated, contact information, and custom metadata. Service update information 992 as depicted in FIG. 9 shows these values as they may have been entered using the various user interfaces described above with respect to FIGS. 3-8, and therefore their description is not repeated here.

Message operations information 993 provides a user with information regarding specific operations of a web service. For example, according to message 991 of FIG. 9, a change to three operations of the VehicleInventory update from version 1 to version 2 will be caused if version 2 is executed. For each of these depicted operations, operation information 993 includes a name, version number, description, and status of the operation.

The techniques described above as directed to providing SOA service dependency management for a single SOA system 101, 201. In other examples, the techniques of this disclosure may be provided for multiple, independent SOA systems that communicate with one another, for example SOA systems operating on multiple domains.

Figure 10:
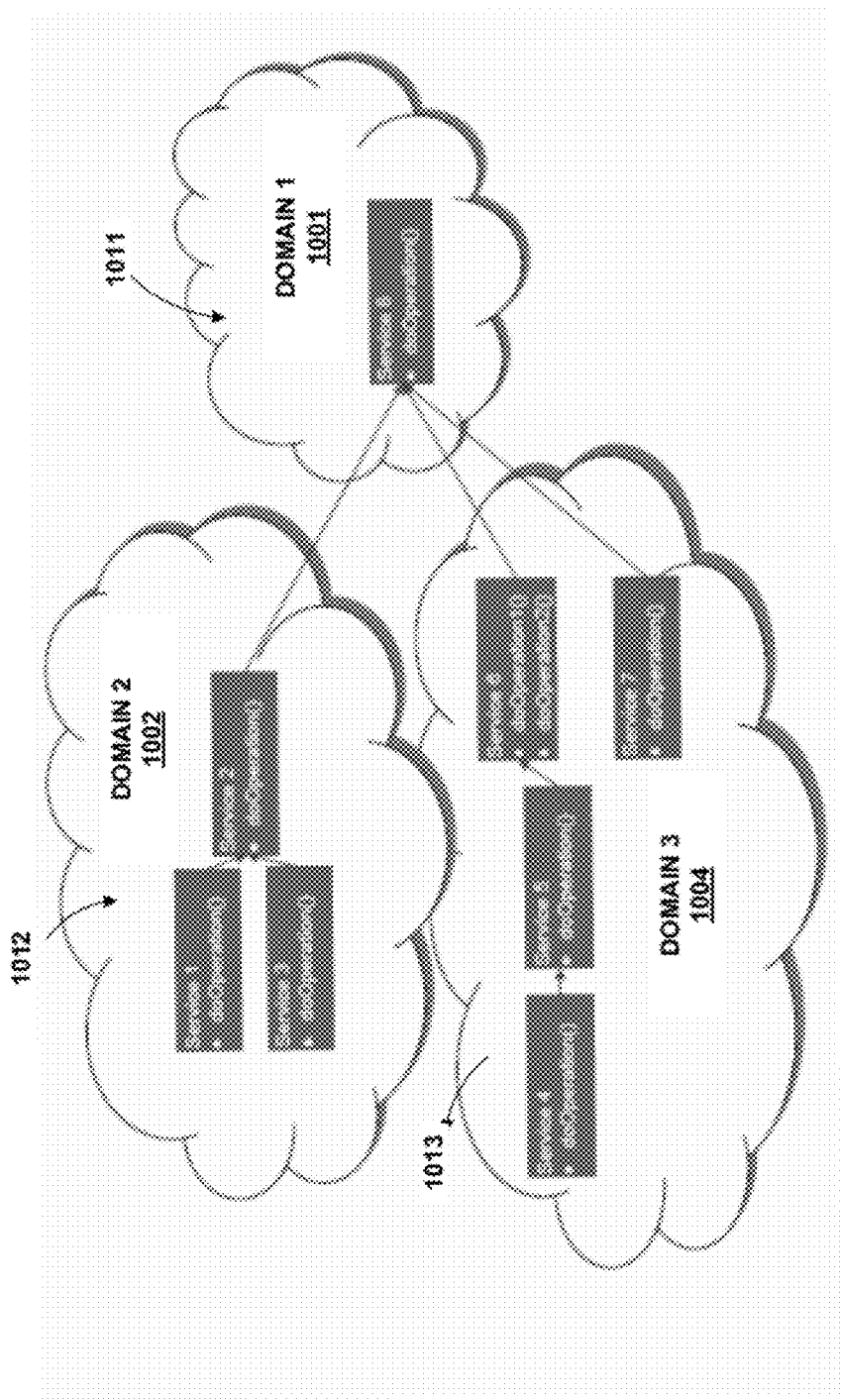
FIG. 10 is a conceptual diagram that illustrates a plurality of inter-connected SOA systems consistent with the techniques of this disclosure.

FIG. 10, for example, is a conceptual diagram illustrating one example of a multiple inter-coupled SOA systems 1011, 1012, and 1013. Each respective system may operate within a respective domain. In the example of FIG. 10, SOA system 1011 operates within a first domain 1001, SOA system 1012 operates within a second domain 1002, and SOA system 1013 operates within a third domain 1003. Domains 1001, 1002, and 1003 may represent different interrelated governmental, industrial, or commercial entities. For example, domain 1001 may be directed to the Army, domain 1002 the Navy, and domain 1003 the Air Force. Each of the respective SOA systems illustrated in FIG. 10 may include one or more services. The one or more services may depend on services of the same domain, or services of other domains, for operation. For example, as depicted in FIG. 10, service 8 of SOA system 1011, doOperation( ), depends directly on services 2, 6, and 7, and indirectly on services 1, 3, 4, and 5 of SOA systems 1012 and 1013, respectively.

Figure 11:
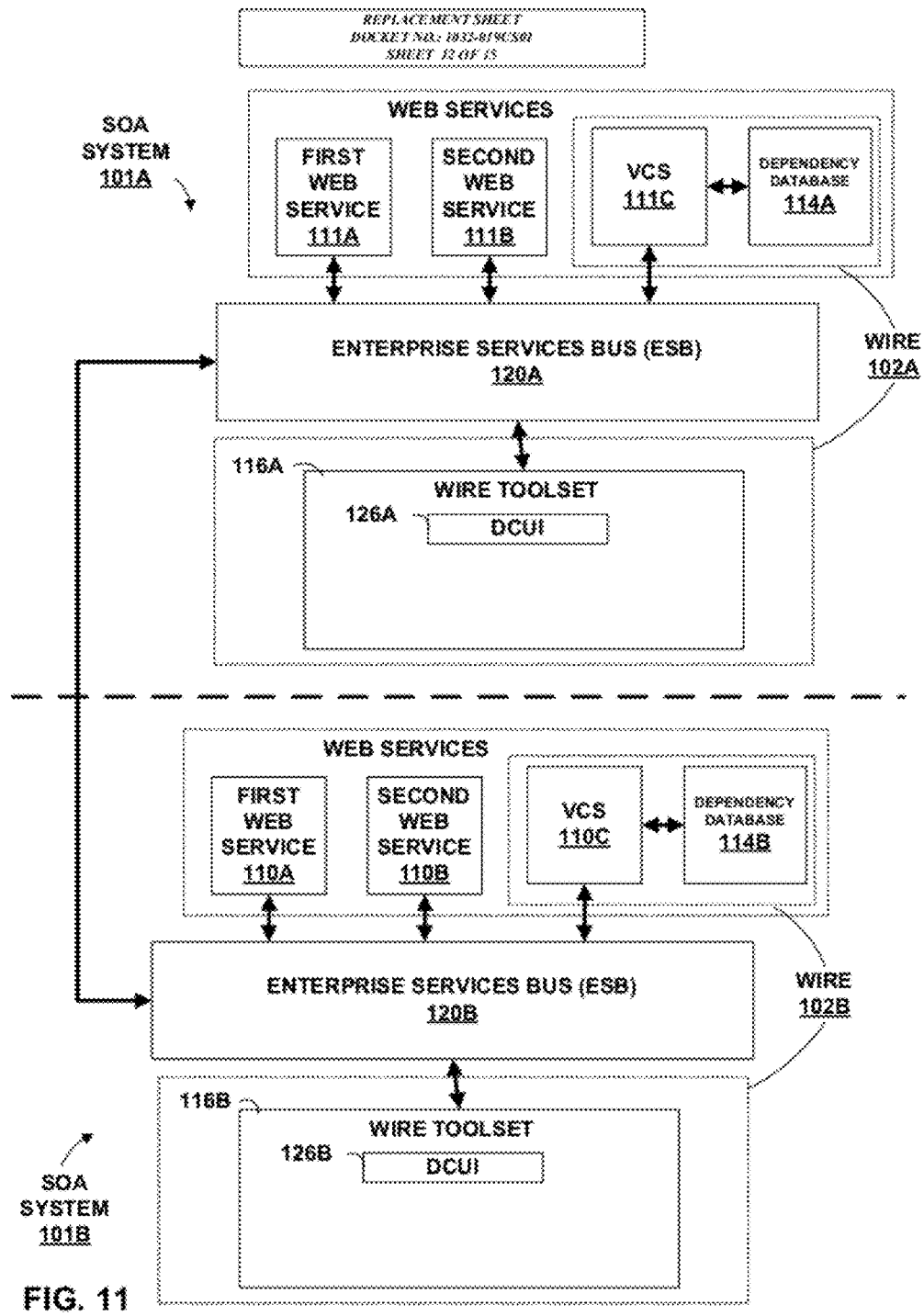
FIG. 11 is a block diagram that illustrates one example of dependency control for a multi-SOA system consistent with the techniques of this disclosure.

FIG. 11 is a block diagram that illustrates one example of a multi-SOA system architecture. The example of FIG. 11 shows two SOA systems, system 101A and system 101B. The respective SOA systems 101A, 101B may operate on different domains, such as domain 1 1001 and domain 2 1002 depicted in FIG. 10. As shown in FIG. 11, each of SOA systems 118A, 118B includes a plurality of web services (110A, 110BA; 111AB, 111B, respectively). Also, each SOA system 101A, 101B includes an enterprise service bus 120A, 120B, respectively. As shown in FIG. 11, ESB 120A is communicatively coupled to ESB 120B. As such, web services of SOA system 101A may communicate with web services 101B, and therefore may depend on one another for operations.

As also shown in FIG. 11, a WIRE system 102A, 102B, has been integrated into each of SOA systems 101A, 101B, respectively. Each WIRE system 102A, 102B may provide for version control as described herein for the respective SOA system 101A, 101B. WIRE systems 102A, 102B may also communicate with one another to exchange information, such that the above-described functionality may be provided to users for inter-SOA system dependency. In other examples not depicted in FIG. 11, a single WIRE system may be employed that provides for the above-described functionality for multiple SOA systems that are to exchange information with one another. According to this example, the single WIRE system may be coupled to both enterprise service busses 120A, 120B, to facilitate the functionality described above.

Figure 12:
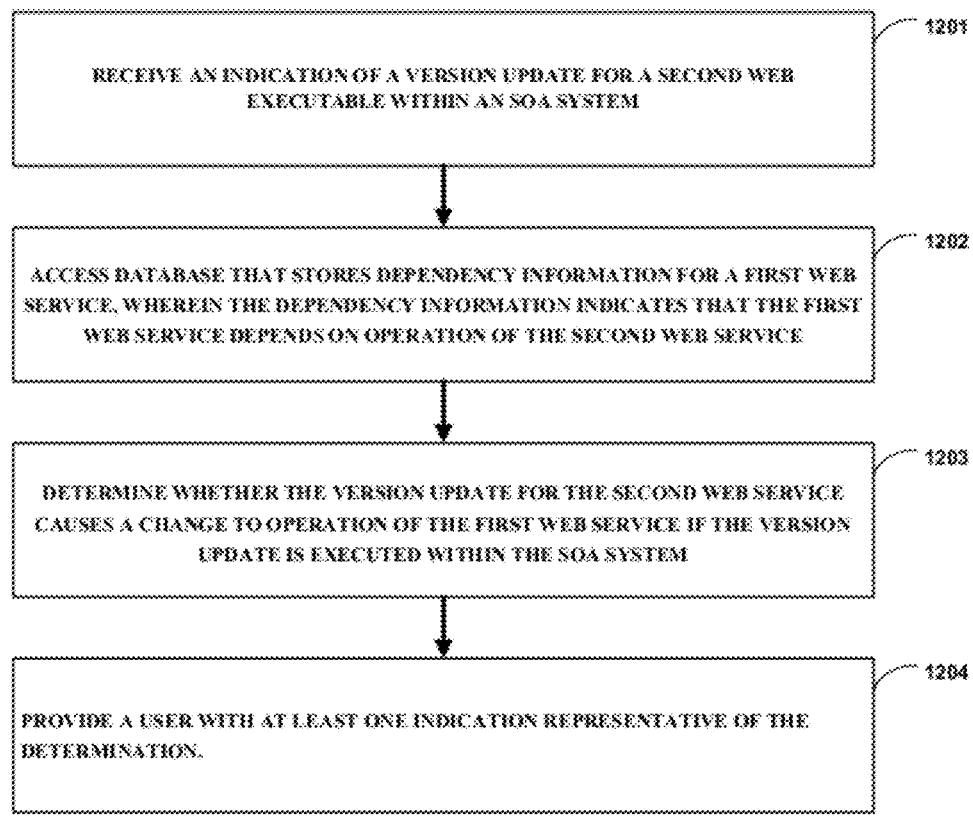
FIG. 12 is a flow chart that illustrates one example of a method of providing a dependency control indication for web services of an SOA system consistent with the techniques of this disclosure.

FIG. 12 is a flow diagram that illustrates one example of a method of reporting dependency information for a service oriented architecture (SOA) system consistent with the techniques of this disclosure. As shown in FIG. 12, the method includes receiving an indication of a version update for a first web service executable (e.g., web service 110A depicted in FIG. 1) within an SOA system (e.g., SOA system 101) (1201). The method further includes accessing, by a version control service (e.g., VCS 110C), a database (e.g., DCD 114) that stores dependency information for at least one second web service (112) executable within the SOA system (1202). The dependency information indicates that the second web service (110B) depends at least in part on operation of the first web service (110A) executable within the SOA system (101). The method further includes determining, by the version control service (112) based on the dependency information stored in the database (114), whether the version update for the first web service (110A) will cause a change to operation of the second web service (110B) if the version update is executed within the SOA system (101) (1203). The method further includes providing a user with at least one indication representative of the determination (1204). In one example, the at least one indication comprises a message to a user, such as message 990 depicted in FIG. 9. In other examples, the at least one indication is provided in response to a user request for information, such as via a dependency control user interface 326 as discussed and described with respect to the various examples depicted in FIGS. 3-9.

Figure 13:
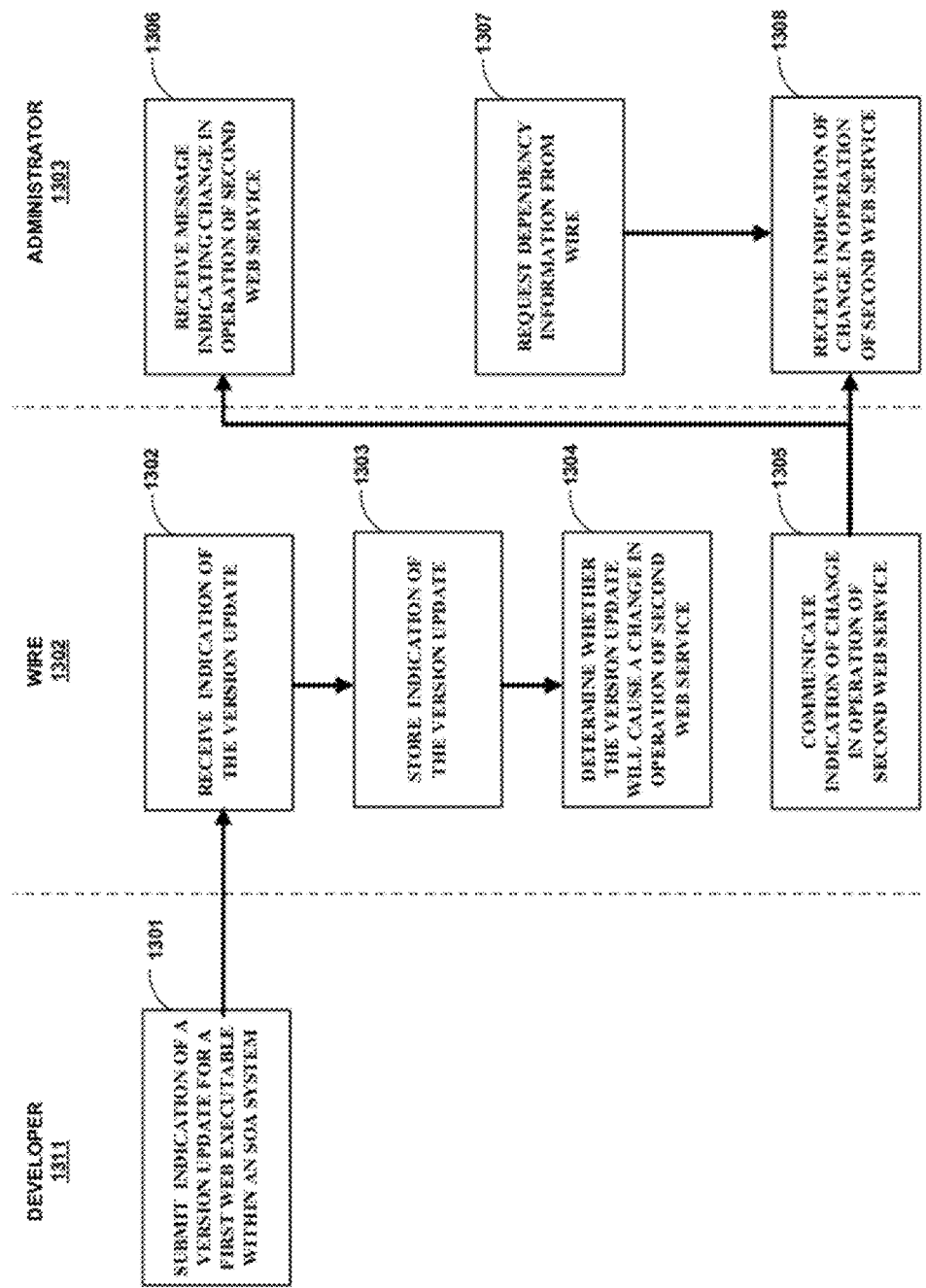
FIG. 13 is a flow chart that illustrates one example of how users might interact with a WIRE system consistent with the techniques of this disclosure.

FIG. 13 illustrates a flow diagram that illustrates one specific example of the use of a WIRE system 1312 by a developer user 1311 and/or an administrator user 1313. This example is provided merely for purposes of describing the techniques of this disclosure, and is intended to be non-limiting. As shown in FIG. 12, a developer 1311 of a web service may submit an indication of a version update for a first web service. The indication of a version update may include information such as described herein with respect to service UI 370, 470 depicted in FIGS. 3 and 4, and operations UI 372, 572 depicted in FIGS. 3 and 5. For example, a developer may use a service UI 370, 470 to submit an indication of a new version update, such as an identification of the new version and what has changed, and/or a developer may use an operations UI 372, 572 to submit changes to one or more operations, inputs/outputs, and/or data types of inputs/outputs for a new version in comparison to another version, such as an older version, of the web service.

As depicted in FIG. 13, WIRE system 1312 may receive the indication of a version update (1302). For example, VCS 110C may receive, from DCUI 126, the indication of the version update. In one example, in response to the received indication, VCS 110C stores the indication of a version update for later use (1303). In another example, VCS 110C instead or in addition determines, based on the indication and/or other information stored in DCD 114, whether the version update will cause a change in operation of another web service (e.g., second web service 110B) of the SOA system (1304).

As also shown in FIG. 13, VCS 110C and/or DCUI 126 may communicate, to a user, an indication of the change in operation to the second web service 110B caused by the version update for the first web service 110A (1305). For example, VCS 110C may communicate, to a user responsible for the second web service, a message indicating that a change will be caused, what is changed, and or what other web services may be affected by the new version, if it is executed within the SOA system (1308). As another example, where VCS 110C has stored received information in DCD 114, a user, such as an administrator 1313, may request from WIRE 1312 (e.g., via DCUI 126), dependency information (1307). In response to the request, WIRE 1312 may provide a user with an indication of the change in operation to the second web service that will be caused by the new version of the first web service (1308). For example, WIRE 102 may provide a user with a graph, chart, or other information indicating the change in operation to the second web service, as shown with respect to dependency UI 376, 676, and SOA system dependency graph IU 378, 778 in FIGS. 3, 6, and 7, respectively.

FIG. 14 is a block diagram that illustrates one example of a database schema that may be used to store dependency information consistent with the techniques of this disclosure. FIG. 14 illustrates various data types that may be stored in a dependency control database (DCD) 114, 214 as described herein. According to the techniques of this disclosure, version control service (VCS) 112, 212 may access DCD 114, 214 to quickly determine dependency data for at least one web application. For example, VCS 110C, 212 may access data stored according to the database schema illustrated in FIG. 14 to determine whether or not a version update for a web application of an SOA system will cause a change in operation for another web application of the SOA system. Furthermore, at least some of the data depicted in FIG. 14 may be edited and or viewed by a user via a VCS 326 as illustrated in FIG. 3. In addition, at least some of the data depicted in FIG. 14 may be communicated to one or more users in the form of a message, one example of which is depicted in FIG. 9.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

The invention claimed is:

1. A method of reporting dependency information for a service oriented architecture (SOA) system, the method comprising:
receiving version information indicating a version update for a first web service executable within a SOA system, wherein the first web service comprises one of a plurality of web services of the SOA system that execute on a plurality of computing devices operating within a network, wherein the version information includes information specifying one or more differences between the first web service after the version update and the first web service before the version update, and wherein each of the web services provides a respective software interface to exchange data over the network via one or more messaging protocols;

accessing, by a version control service, a database that stores dependency information for a second web service executable within the SOA system, wherein the dependency information specifies that the respective software interface of the second web service invokes the respective software interface of the first web service to exchange data over the network with the first web service;

determining, by the version control service based on the dependency information stored in the database and on the version information, that the version update for the first web service will affect the exchange of data with the second web service to cause a specific change of operation of the second web service if the version update is executed within the SOA system; and providing a user with a representation of the dependency information and at least one representation of the specific change of operation of the second web service.

2. The method of claim 1, wherein determining, by the version control service, that the version update for the first web service will affect the exchange of data with the second web service to cause the specific change of operation of the second web service if the version update is executed within the SOA system comprises determining without executing the first web service.

3. The method of claim 1, wherein the representation of the dependency information is a graphical representation and the at least one representation of the specific change of operation of the second web service is at least one graphical representation.

4. The method of claim 1, wherein providing the user with the representation of the dependency information and the at least one representation of the specific change of operation of the second web service comprises outputting the representation of the dependency information and the at least one representation of the specific change of operation of the second web service by a user interface of the version control service.

5. The method of claim 1, wherein providing the user with the representation of the dependency information and the at least one representation of the specific change of operation of the second web service comprises outputting the representation of the dependency information and the at least one representation of the specific change of operation of the second web service by a user interface of a third web service of the SOA system.

6. The method of claim 1, wherein the first web service and the second web service are communicatively coupled to one another via an Enterprise Service Bus (ESB).

7. The method of claim 1, wherein accessing the database comprises:

accessing one or more web services description language (WSDL) documents that define the respective software interfaces of the first web service and the second web service including input received by the respective software interfaces and output produced by the respective software interfaces.

8. The method of claim 1, further comprising:
categorizing the specific change of operation of the second web service when executed.

9. The method of claim 8, wherein categorizing the specific change of operation of the second web service comprises assigning an effect the version update for the first web service will have on operation of the second web service to indicate that
a format of data exchanged between the first web service and the second web service will be incompatible.

10. The method of claim 1, further comprising:
notifying the user of additional details of the specific change of operation of the second web service if the version update for the first web service is executed.

11. The method of claim 10, wherein notifying the user comprises communicating via email, text message, or real simple syndication (RSS).

12. The method of claim 1, further comprising:
executing the version update for the first web service.

13. An article of manufacture comprising a non-transitory computer-readable medium that stores instructions configured to cause a computing device to:

receive version information indicating a version update for a first web service executable within a service oriented architecture (SOA) system, wherein the first web service comprises one of a plurality of web services of the SOA system that execute on a plurality of computing devices operating within a network, wherein the version information includes information specifying one or more differences between the first web service after the version update and the first web service before the version update, and wherein each of the web services provides a respective software interface to exchange data over the network via one or more messaging protocols;

access, by a version control service, a database that stores dependency information for a second web service executable within the SOA system, wherein the dependency information specifies that the respective software interface of the second web service invokes the respective software interface of the first web service to exchange data over the network with the first web service;

determine, by the version control service based on the dependency information stored in the database and on the version information, that the version update for the first web service will cause a specific change of operation of the second web service if the version update is executed within the SOA system; and provide a user with a representation of the dependency information and at least one representation of the specific change of operation of the second web service.

14. The article of manufacture of claim 13, wherein the instructions cause the computing device to determine that the version update for the first web service will cause the specific change of operation of the second web service without executing the version update for the first web service.

15. The article of manufacture of claim 13, wherein the representation of the dependency information is a graphical representation and the at least one representation of the specific change of operation of the second web service is at least one graphical representation.

16. The article of manufacture of claim 13, wherein providing the user with the representation of the dependency information and the at least one representation of the specific change of operation of the second web service comprises:

providing the user with at least one user interface configured to provide the representation of the dependency information and the at least one representation of the specific change of operation of the second web service.

17. The article of manufacture of claim 13, wherein the first web service and the second web service are communicatively coupled to one another via an Enterprise Service Bus (ESB).

18. The article of manufacture of claim 13, wherein the instructions are further configured to cause the computing device to:

notify the user of additional details of the specific change of operation of the second web service if the version update for the first web service is executed.

19. A computing device, comprising:
means for receiving version information indicating a version update for a first web service executable within a service oriented architecture (SOA) system, wherein the first web service comprises one of a plurality of web services of the SOA system that execute on a plurality of computing devices operating within a network, wherein the version information includes information specifying one or more differences between the first web service after the version update and the first web service before the version update, and wherein each of the web services provides a respective software interface to exchange data over the network via one or more messaging protocols;
means for accessing a dependency control database that stores dependency information for a second web service executable within the SOA system, wherein the dependency information specifies that the respective software interface of the second web service invokes the respective software interface of the first web service to exchange data over the network with the first web service;
means for determining, based on the dependency information and the version information, that the version update for the first web service will affect the exchange of data with the second web service to cause a specific change of operation of the second web service if the version update for the first web service is executed within the SOA system; and
means for providing a user with a representation of the dependency information and at least one representation of the specific change of operation of the second web service.

20. The computing device of claim 19, wherein the means for determining that the version update for the first web service will affect the exchange of data with the second web service to cause the specific change of operation of the second web service without executing the version update for the first web service.

21. The computing device of claim 19, wherein the representation of the dependency information is a graphical representation and the at least one representation of the specific change of operation of the second web service is at least one graphical representation.

22. The computing device of claim 19, wherein the representation of the dependency information and the at least one representation of the specific change of operation of the second web service is provided via at least one user interface.

23. The computing device of claim 19, wherein the first web service and the second web service are communicatively coupled to one another via an Enterprise Service Bus (ESB).

24. The computing device of claim 19, further comprising:
means for notifying the user of additional details of the specific change of operation of the second web service if the version update for the first web service is executed.

25. A system for dependency information for a service oriented architecture (SOA) system, comprising:
one or more non-transitory computer readable media that store a dependency control database;
a version control service that receives version information indicating a version update for a first web service executable within a SOA system, wherein the first web service comprises one of a plurality of web services of the SOA system that execute on a plurality of computing devices operating within a network, wherein the version information includes information specifying one or more differences between the first web service after the version update and the first web service before the version update, and wherein each of the web services provides a respective software interface to exchange data over the network via one or more messaging protocols,
wherein the dependency control database stores dependency information for a second web service executable within the SOA system, wherein the dependency information specifies that the respective software interface of the second web service invokes the respective software interface of the first web service to exchange data over the network with the first web service,
wherein the version control service determines, based on the dependency information and the version information, that the version update for the first web service will affect the exchange of data with the second first web service to cause a specific change of operation of the second web service when the version update is executed within the SOA system, and
wherein the version control service provides a user with a representation of the dependency information and at least one representation of the specific change of operation of the second web service.

26. The system of claim 25, wherein the version control service determines that the version update for the first web service will cause the specific change of operation of the second web service without executing the version update for the first web service.

27. The system of claim 25, wherein the representation of the dependency information is a graphical representation and the at least one representation of the specific change of operation of the second web service is at least one graphical representation.

28. The system of claim 25, wherein the representation of the dependency information and the at least one representation of the specific change of operation of the second web service is provided via at least one user interface.

29. The system of claim 25, wherein the first web service and the second web service are communicatively coupled to one another via an Enterprise Service Bus (ESB).

30. The system of claim 25, wherein the version control service notifies the user of additional details of the specific change of operation of the second web service if the version update for the first web service is executed.

* * * * *